United States Patent
Miyasaka et al.

(10) Patent No.: US 6,360,135 B1
(45) Date of Patent: Mar. 19, 2002

(54) PRINTING APPARATUS WITH A CASH DRAWER CONTROL FUNCTION, AND A CONTROL METHOD THEREFOR

(75) Inventors: Masayo Miyasaka; Takuya Hyonaga; Takaaki Akiyama; Naohiko Koakutsu; Mitsuaki Teradaira, all of Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/361,659

(22) Filed: Jul. 27, 1999

Related U.S. Application Data

(63) Continuation of application No. 08/730,694, filed on Oct. 11, 1996, which is a continuation-in-part of application No. 08/335,604, filed on Nov. 8, 1994, now Pat. No. 5,594,653.

(30) Foreign Application Priority Data

| Nov. 8, 1993 | (JP) | 5-278637 |
| Nov. 8, 1993 | (JP) | 5-278638 |
| Nov. 8, 1993 | (JP) | 5-278639 |
| Oct. 13, 1995 | (JP) | 7-265881 |

(51) Int. Cl.[7] .............. G06F 3/12; G07G 1/14
(52) U.S. Cl. ............ 700/213; 700/9
(58) Field of Search .............. 700/9, 11, 21, 700/79, 213, 219, 222; 702/188; 705/21

(56) References Cited

U.S. PATENT DOCUMENTS

| 4,396,976 A | 8/1983 | Hyatt |
| 4,438,507 A | 3/1984 | Nakajima |
| 4,452,136 A | 6/1984 | Boynton et al. |
| 4,454,575 A | 6/1984 | Bushaw et al. |
| 4,877,345 A | 10/1989 | Hori |
| 4,943,936 A | 7/1990 | Hirai et al. |
| 4,989,163 A | 1/1991 | Kawamata et al. |
| 4,991,972 A | 2/1991 | Ikenoue et al. |
| 5,088,033 A | 2/1992 | Binkley et al. |
| 5,124,809 A | 6/1992 | Koishikawa |
| 5,398,305 A | 3/1995 | Yawata et al. |
| 5,418,891 A | 5/1995 | Yang |
| 5,428,714 A | 6/1995 | Yawata et al. |
| 5,594,653 A | 1/1997 | Akiyama et al. |
| 5,706,411 A | 1/1998 | McCormick et al. |
| 5,720,015 A | 2/1998 | Martin et al. |

FOREIGN PATENT DOCUMENTS

| DE | 38 11 661 | 10/1988 |
| EP | 0 470 782 | 2/1992 |
| JP | 61-009723 | 1/1986 |
| JP | 61-175816 | 8/1986 |
| JP | 63-021178 | 1/1988 |
| JP | 63-175918 | 7/1988 |
| JP | 1302453 | 12/1989 |
| WO | 82 01609 | 5/1982 |

OTHER PUBLICATIONS

Receipt, journal, slip printer TM–930II series Operator's Manual, 1991.

*Primary Examiner*—Paul P. Gordon
(74) *Attorney, Agent, or Firm*—Mark P. Watson

(57) ABSTRACT

A printing apparatus comprises a real-time command interpreter that functions even when the printing apparatus is off-line, and interprets control commands simultaneously with receiving data. The printing apparatus can therefore output pulses to the external devices even when printing is in progress or the printer is off-line. Such printing apparatus comprises a command detector for directly detecting predetermined command data from the received command data. An external controller controls an external device in accordance with predetermined command data detected by the command detection.

26 Claims, 18 Drawing Sheets

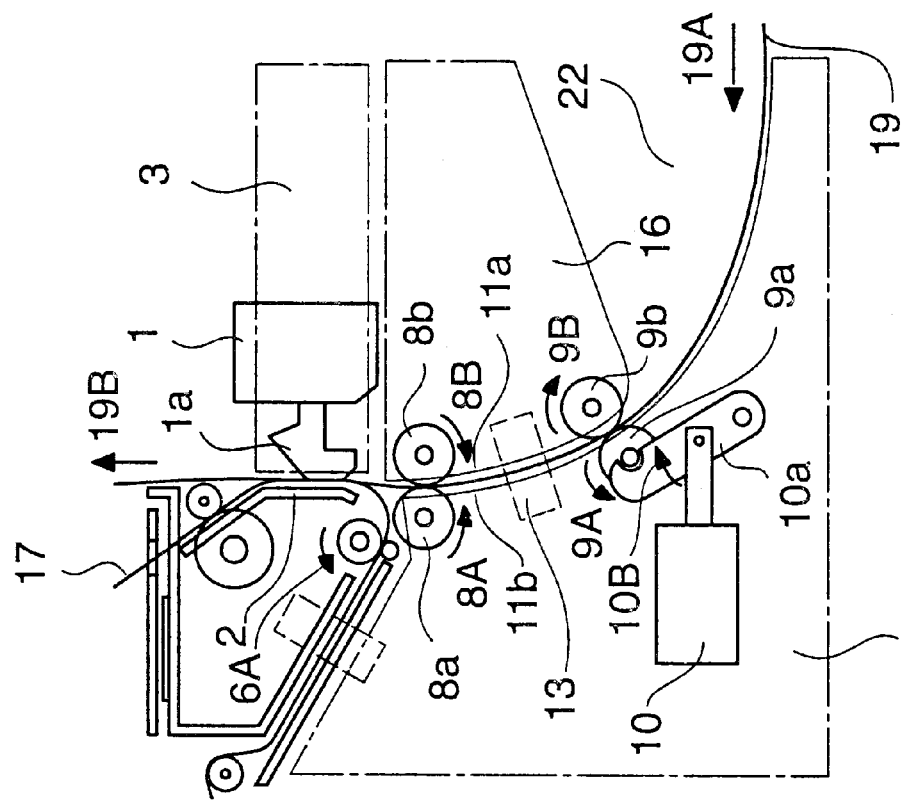
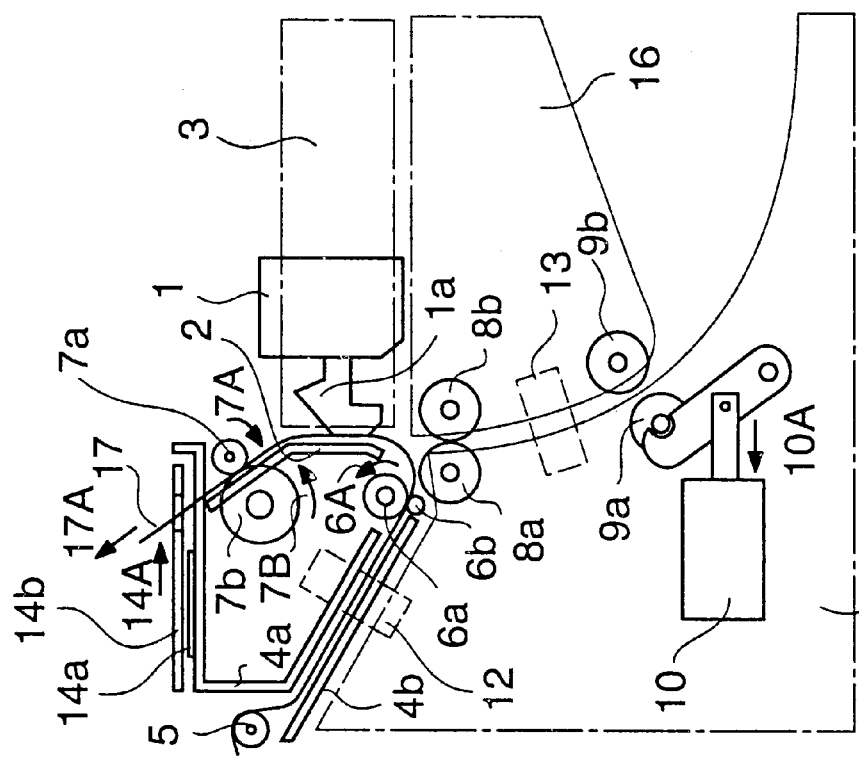
FIG. 2B
FIG. 2A

| GS | R | n |
|---|---|---|
| (1Dh) | (52h) | (n) |

PRINTING APPARATUS WITH A CASH DRAWER CONTROL FUNCTION, AND A CONTROL METHOD THEREFOR

CONTINUING APPLICATION DATA

This application is a continuation of 08/730,694, filed on Oct. 11, 1996, which is a continuation-in-part application of application Ser. No. 08/335,604, filed on Nov. 8, 1994, now U.S. Pat. No. 5,594,653. The contents of each of which are incorporated herein by reference.

BACKGROUND OF THE INVENTION

1. Field of the Invention

The present invention relates to a printing apparatus, comprising a cash drawer control function and to a control method therefor, and relates particularly to a printing apparatus capable of controlling the cash drawer irrespective of the status of the printing apparatus. The present invention is therefore particularly effective when used with systems for processing monetary transactions, such as point-of-sale (POS) terminals and electronic cash registers (ECR).

2. Description of the Related Art

In a conventional printing apparatus when continuing the printing operation is inappropriate, such as when the paper supply is depleted, the printer cover is opened, or an error occurs, conventional printing apparatuses typically stop the printer mechanism containing the printing head, and bring the interface to the host computer off-line (a logical non-connection state) to both protect the printing apparatus and the communications data, and assure user safety. Once this off-line state is entered, however, internal control of the printer apparatus stops, and the data already transferred to the printer apparatus is no longer processed. Data is also no longer received by the printer apparatus, and the printer apparatus cannot receive or process any data output thereto or respond to inquiries from the host computer.

The printing apparatus even moves off-line when the form-feed switch is pressed and paper is being advanced, and when the data receiving buffer storing the received data is full (a buffer full state), and it is difficult to distinguish between these off-line states and off-line states in which it is inappropriate to continue printing.

When the printing apparatus goes off-line, the host computer is no longer able to send the print data, and the complete system, POS, ECR, or other, comes to a stop.

In such a case, the host computer typically displays a message such as "printer problem, please check" on the display device, and the user must manually inspect the printing apparatus and correct the problem leading to the off-line state. However, for many general POS and ECR users, determining the problem is often difficult and time-consuming.

On the other hand, control commands stored in the data receiving buffer are interpreted in a first-in-first-out (FIFO, the first commands stored are the first interpreted) order, and the appropriate command process is executed. Control commands that have been processed are deleted from the data receiving buffer. As a result, as control commands are successively input from the host computer, the commands are stored one after the other in the data receiving buffer, and processed in order from the oldest control command stored. This creates a time lag between output of the control command from the host computer and actual execution of the control command by the printing apparatus.

In conventional printing apparatuses handling cut-sheet forms, the printer mechanism and printer head must be stopped to wait for insertion of the cut-sheet form when the host computer selects a cut-sheet form for printing. Because internal control of the printing apparatus stops at this time, the data received from the host computer once the cut-sheet form selection is made is not processed, and there is no response from the printing apparatus, until the cut-sheet form is inserted or a predetermined cut-sheet form insertion waiting period is completed.

As a result, if the user mistakenly selects cut-sheet form printing, the POS/ECR terminal stops processing for the period, thus delaying further processing and causing the customer to wait. When the printing apparatus is reset or the power is turned off and then on again, the data controlling the printing apparatus settings stored in the printing apparatus is lost. This is a significant problem for a printing apparatus used in POS/ECR terminals in financial transaction systems.

Errors generated in the printing apparatus include recoverable errors, such as paper jams in the paper transport path, and non-recoverable errors, such as problems with the power supply voltage from the AC-DC converter and damage to the head temperature detector of the print head. The methods of handling recoverable and non-recoverable errors differ greatly, and it is therefore necessary to distinguish between the two; this is, however, difficult for the average user.

Furthermore, even if the cause of the error is removed in conventional printing apparatuses, it is necessary to reset the printing apparatus or turn the power off and then on again to escape from the error state. Both of these operations also destroy the data stored to that point in the printing apparatus.

To minimize the effects of these problems, the host computer in data processing systems using such conventional printing apparatuses adds a status request command to each line of data instead of batch sending plural lines of data, and uses the response to determine the current status of the printing apparatus. This, however, adds significant overhead to the host computer, and leads to reduced throughput in the data processing system.

As a result of the above, stand-alone type dedicated data processing systems integrating the data entry device, processing device, and printing apparatus are widely used in conventional POS/ECR systems. Systems connecting a host computer with a printing apparatus using a general-purpose interface are not widely used, even though they offer excellent flexibility, due data reliability problems (i.e., security issues). To improve data reliability and simultaneously improve operability (usability), it is desirable to have a data processing system whereby the cause of any stop in printing apparatus operation can be known even while the printing apparatus is in an off-line state, and the cause of the problem can be quickly corrected.

Moreover, conventional POS and ECR systems typically place the cash drawer in which money is held below the printing apparatus, and issue the cash drawer open/close signal from the printing apparatus. So-called terminal printing apparatuses that are connected through some interface to a host device to execute a printing process according to the control commands received from the host device comprise a means for outputting the cash drawer open/close signal for a specified time from the output port of the specified port number. To reduce the standby time to completion of the control commands of the host device, the control commands are temporarily stored to a command buffer, and then read and executed in the order stored (first-in-first-out).

While the command buffer size varies according to the model and application of the printing apparatus, the command buffer is often also used as a print data buffer, and can therefore generally store a large number of control commands. Therefore, when many control commands are stored in the command buffer, significant time may be required to open the cash drawer even though the cash drawer open command has been sent from the host device. More specifically, once a receipt printing or other printing process has been started, monetary transactions such as storing cash received or making customer change must wait until the printing process has completed. As a result, the user must wait for an extended period of time, and numerous problems therefore remain for printing apparatuses used in systems for processing monetary transactions, such as point-of-sale (POS) terminals and electronic cash registers (ECR).

Faster processing is demanded in printing apparatuses for the POS/ECR market in recent years. Because transaction processing in particular requires manual intervention, it is necessary to open the cash drawer immediately as soon as an open request is issued.

OBJECTS OF THE INVENTION

Therefore, an object of the present invention is to provide a printing apparatus whereby the above problems can be solved.

It is another object of the present invention to provide a high reliability data processing apparatus.

It is a further object of the present invention to reduce the overhead on the host computer.

It is an additional object of the present invention to provide a user-friendly apparatus.

SUMMARY OF THE INVENTION

To achieve the above objects, a printing apparatus according to the present invention comprises: a receiving means for receiving control commands and print data; a storage means for storing at least the control commands; a first control command interpreting means for interpreting the control commands received by the receiving means; a second control command interpreting means for reading and interpreting the control commands stored in the storage means in a first-in-first-out (FIFO) order; and a process execution means for executing the corresponding processes based on the interpreted results output from the first and second control command interpreting means. In this printing apparatus, the process execution means executes the process corresponding to the interpreted result output from the first control command interpreting means with priority over the process corresponding to the interpreted result output from the second control command interpreting means.

The process execution means comprises: a first process execution means for executing the process corresponding to the control command based on the interpreted result output from the first control command interpreting means; and a second process execution means for executing the process corresponding to the control command based on the interpreted result output from the second control command interpreting means; and the first process execution means executes the required process while interrupting the operation of the second process execution means.

To enable the host device to determine the cause of the stop in printing apparatus operation, the printing apparatus of the invention may further comprise: a device-condition detection means for detecting the status of the printing apparatus; a control means for prohibiting or permitting operation of the received-data storage means according to the detection result output from the device-condition detection means; and a transmission means for transmitting data to the host device. In this embodiment, the first process execution means comprises a device-condition reporting means for reporting the data obtained by the device-condition detection means to the transmission means.

To enable the host device to recover from errors in the printing apparatus, the printing apparatus of the invention further comprises an error state flag storage means for storing error state flags set according to the occurrence of error states. The printing apparatus in this case further comprises the second process execution means stopping process execution while the error state flag is set; and the first process execution means comprising an error state flag resetting means for resetting the error state flag.

To further enable the host device to cancel the cut-sheet form insertion waiting state of the printing apparatus, the printing apparatus of the invention further comprises a cut-sheet transport means for transporting and supplying cut-sheet print media to the printing means; a cut-sheet transport control means for waiting until a cut-sheet print medium is supplied to the cut-sheet transport means, and then beginning print medium supply by the cut-sheet transport means; and a cut-sheet transport state detection means for detecting the status of the cut-sheet transport control means. The first process execution means in this case comprises a cut-sheet supply wait-state cancellation means for canceling operation of the cut-sheet transport control means when the cut-sheet supply wait-state of the cut-sheet transport control means is detected by the cut-sheet transport state detection means.

A data processing apparatus according to the invention using a printing apparatus according to the invention comprises a printing apparatus and a host device. The printing apparatus of this data processing apparatus comprises: a transmission apparatus for transmitting data to the host device; a receiving means for receiving said control commands and print data; a storage means for storing at least the control commands; a device-condition detection means for detecting the status of the printing apparatus; a control means for prohibiting or permitting operation of the received-data storage means according to the detection result output from the device-condition detection means; a first control command interpreting means for interpreting the control commands received by the receiving means; a second control command interpreting means for reading and interpreting the control commands stored to the received-data storage means in a first-in-first-out (FIFO) order; a device-condition reporting means for reporting the data obtained by the device-condition detection means to the transmission means based on the interpreted result of the first control command interpreting means; and a normal process execution means for executing the processes corresponding to the control commands based on the interpreted results of the second control command interpreting means.

The device-condition reporting means interrupts operation of the normal process execution means and executes the process.

The host device of this data processing apparatus comprises a storage state detection means for detecting the state of the control means; and a command transmission means for transmitting to the printing apparatus a report device-condition command, the command being a control command requesting transmission of the device condition detection data, and being interpretable by the first control command interpreting means.

By means of the invention thus described, it is possible for the host computer to determine and evaluate the cause of an off-line printing apparatus state even after the printing apparatus goes off-line. The host computer can thus notify the user by means of posting a message, and the system can recover from the off-line state by means of host computer control if the user corrects the cause of the problem. In addition, when the printing apparatus is in a cut-sheet insertion standby state, the waiting state can be canceled by the user issuing a 'cancel cut-sheet insertion waiting state command' from the host computer.

When an error occurs in the printing apparatus, it is also possible for the host computer to determine what error occurred and where, and whether the error is recoverable or non-recoverable. When the error is recoverable, it is also possible to recover from the error and resume printing once the user corrects the cause of the error. It is also possible to select whether to resume printing from the print line at which the error occurred, or to destroy all data already sent and then recover from the error.

In accordance with another aspect of the present invention, a printing apparatus comprises a data receiving means for receiving command data from a host device, a data storage means for storing the command data received by the data receiving means, and a printer control means for reading the command data stored in the data storage means in a first-in-first-out order and controlling the printing process according to the command data. A command detection means is provided for directly detecting specific command data from the command data received by the data receiving means, and an external device control means is further provided for controlling an external device connected to the printing apparatus according to the predetermined command data detected by the command detection means.

As a result of this configuration, it is therefore possible to independently control an externally connected device as requested by the host device even when command data for the printing process is stored in the data storage means.

To achieve this, it is possible for the external device control means to control the external device parallel to the printer control means controlling the printing process, to control the external device with priority over the printer control means controlling the printing process, or to control the external device according to the end of the printing process when a printing process is being executed by the printer control means.

The process sequence is preferably set appropriately with consideration to the power supply capacity, the processing capacity of the printing apparatus, and other considerations. More specifically, if there is sufficient power supply capacity, simultaneously executing control of both the printing apparatus and external device is preferable with respect to processing speed. On the other hand, temporarily interrupting the printing process and controlling the external device is preferable in applications in which controlling the external device is of higher priority. However, if interrupting the printing process will degrade the print quality, it is preferable to make controlling the external device wait until a break point in the printing process that will not result in degraded print quality, such as at the line end.

Moreover, the external device control means may comprise one or more pulse generating means for generating pulses of which the pulse width is determined according to the predetermined command data. When the external device control means thus comprises pulse generating means, it may further comprise a selection means for selecting one of the two or more pulse generating means according to the predetermined command data.

The external device is more specifically a cash drawer, and the external device control means is a drawer control means for controlling cash drawer opening.

The data receiving means preferably receives data from the host device in data units of a known size, the predetermined command data comprises plural data units, and the command detection means comprises a data counter for counting the number of data units, and a comparison means for comparing the data unit received by the data receiving means with a command pattern expressing predetermined command data according to the data counter value.

As a result, the command data received in one-byte units from the host device can be detected and processed as the data is received. It is therefore not necessary to store a specific number of bytes of command data, and the time required for the detection process can be divided into small pieces. Therefore, if either the data receiving means or the command detection means interrupts printing process control by the printer control means to at least either receive data from the host device or detect the predetermined command data, the benefits of distributing the detection process can be obtained.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 2A and 2B are cross-sectional views illustrating the operation of the printing apparatus of the present invention;

FIG. 6 is an example of the command used in the first embodiment of the invention;

DESCRIPTION OF THE PREFERRED EMBODIMENTS

First Embodiment

A first embodiment of the invention is described below with reference to the accompanying figures.

In general, recording paper used in the distribution industry is either cut-sheet or continuous paper. Cut-sheet paper includes irregularly sized, individual voucher forms called slip paper, and multiple-part individual voucher forms, called validation paper, of a relatively regular size. Continuous paper includes journal paper for printing and storing store records, and receipt paper used for simple receipts.

Figure 1:
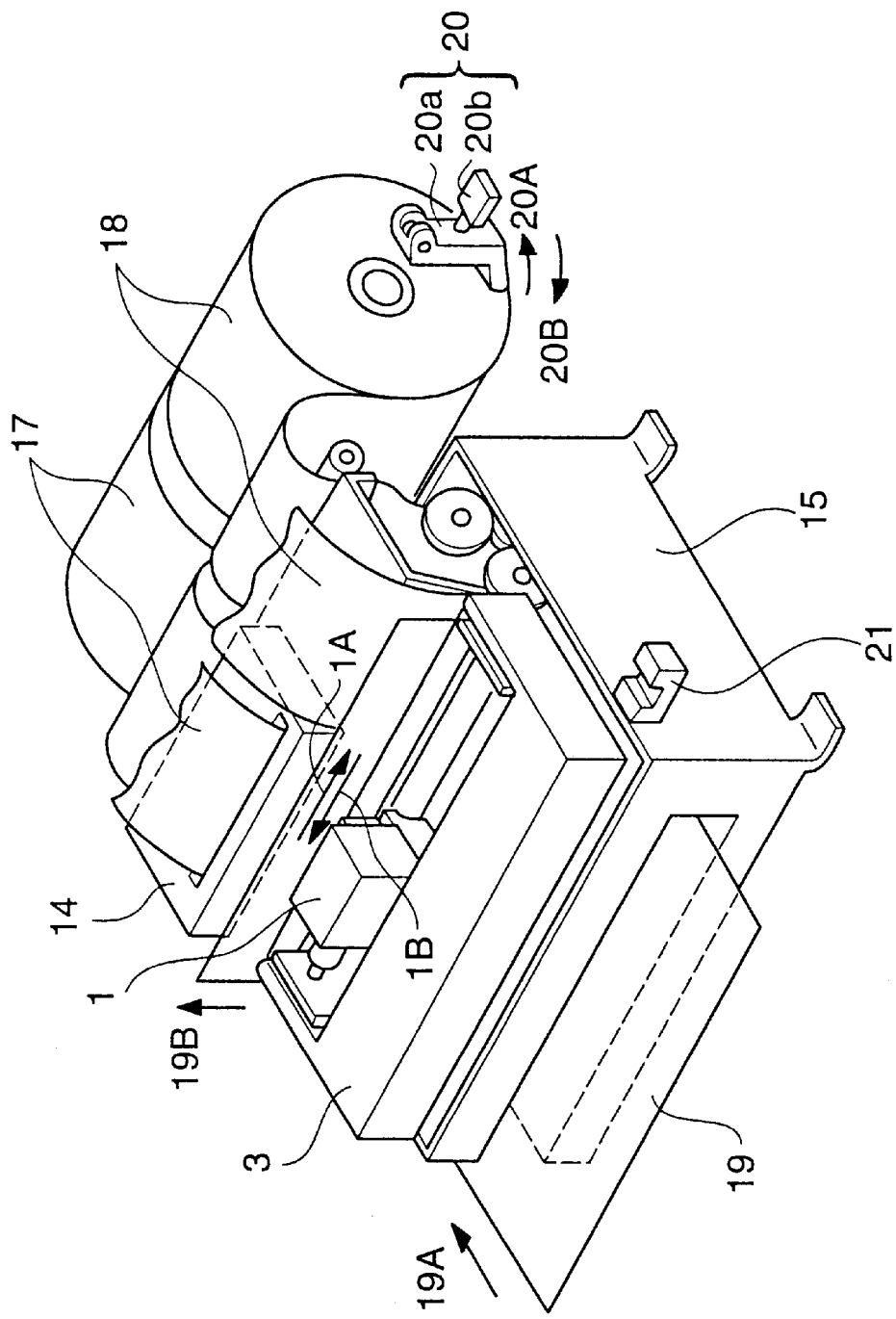
FIG. 1 is an overview of a printing apparatus used for describing a first embodiment of the invention.

FIG. 1 is an overview of a printing apparatus capable of printing on slip-, journal- , and receipt-type recording paper.

As shown in FIG. 1, this printing apparatus comprises printer head 1, which is typically a so-called "wire dot head" comprising plural wires arrayed in a vertical line; and ink ribbon 3. Printer head 1 prints while being driven in a reciprocal motion as indicated by arrows 1A and 1B.

Receipt paper 17 and journal paper 18 are inserted from the back of the printer mechanism in roll form, and are fed out from the top as shown in the figure. Slip paper 19 is inserted from the front of the printer mechanism (arrow 19A), and similarly fed out from the top (arrow 19A).

Near-end detector 20 for detecting the end of the receipt and journal paper is also provided. Near-end detector 20 comprises a near-end detecting lever 20a, which is pushed out in the direction of arrow 20A by the outside diameter of the roll paper, and a push switch 20b, which is turned on/off by near-end detecting lever 20a. The outside diameter steadily decreases as the end of the roll paper approaches, and when the core of the roll paper is reached, near-end detecting lever 20a rotates in the direction of arrow 20B. This causes push switch 20b to switch OFF, thus detecting the near-end of the paper.

After printing is completed, receipt paper 17 is cut by cutter unit 14, and can be handed to the customer.

The printing apparatus is covered by a housing not shown in the figures; this housing comprises a cover that is not shown and lower case 15. Cover detector 21 is an opposed-type photodetector, so called photo-interrupter. When the cover is closed, the beam from cover detector 21 is interrupted, and the cover can be detected to be closed.

FIGS. 2A and 2B are cross-sectional views illustrating the operation of the printing apparatus of the present invention during printing to continuous and cut-sheet paper. FIG. 2A shows printing on continuous paper (receipt paper in the figure); FIG. 2B shows printing on cut-sheet paper (slip paper).

The wire pins (not shown in the figure) of printer head 1 are provided in wire holder 1a for printing through ink ribbon 3 to receipt paper 17 against platen 2.

Receipt paper 17 is fed by transport rollers 6a and 6b passed guide roller 5 and between paper guides 4a and 4b. The one transport roller 6a is connected to a motor or other drive power source (not shown in the figures).

Receipt paper detector 12 is a photo-interrupter, lever switch, or other detecting means positioned in the middle of paper guides 4a and 4b; receipt paper detector 12 is shown as a photo-interrupter in FIG. 2A.

When transported by transport rollers 6a and 6b, receipt paper 17 passes between ink ribbon 3 and platen 2, through presser rollers 7a and 7b and cutter unit 14, and is fed out from the top of the printing apparatus. Cutter unit 14 comprises cutter blade 14a and cutter cover 14b; cutter blade 14a is driven in the direction of arrow 14A by a motor or other drive power source to cut receipt paper 17.

It is to be noted that while receipt paper is shown in the figure, the mechanism used for journal paper is the same except for the cutter unit.

When slip paper is printed (FIG. 2B), slip paper 19 is inserted from slip paper insertion opening 22 at the front of the printing apparatus in the direction of arrow 19A. During roll paper printing, slip feed roller 9a is pulled in the direction of arrow 10A by plunger 10 as shown in FIG. 2A, and is thus separated from the opposing slip transport roller 9b. As a result, it is possible to insert slip paper 19. When slip paper 19 is inserted, slip paper 19 passes between slip paper guides 11a and 11b and abuts slip transport rollers 8a and 8b. Whether slip paper has been inserted is detected by slip paper detector 13. If paper has been inserted, plunger 10 is released and lever 10a moves in the direction of arrow 10B, thus causing slip paper 19 to be held between slip transport rollers 9a and 9b.

Slip transport rollers 8b and 9b are connected to a motor or other drive power source not shown in the figures, and slip paper 19 is transported as slip transport rollers 8b and 9b and the opposing slip transport rollers 8a and 9a rotate in the direction of arrows 8B, 8A, and 9B, 9A respectively. When printing is completed, slip paper 19 is fed out in the direction of arrow 19A, plunger 10 is driven to separate slip transport roller 9a from slip transport roller 9b, and the next slip paper form can be inserted.

Printing on slip paper 19 is possible with receipt paper 17 loaded as shown in the figure, and if carbon paper is added to slip paper 19, the same information can be simultaneously printed on both slip paper 19 and receipt paper 17.

Note that slip paper detector 13 is a photo-interrupter similar to receipt paper detector 12.

Also shown are lower case 15 and case 16 supporting the head assembly.

Figure 3:
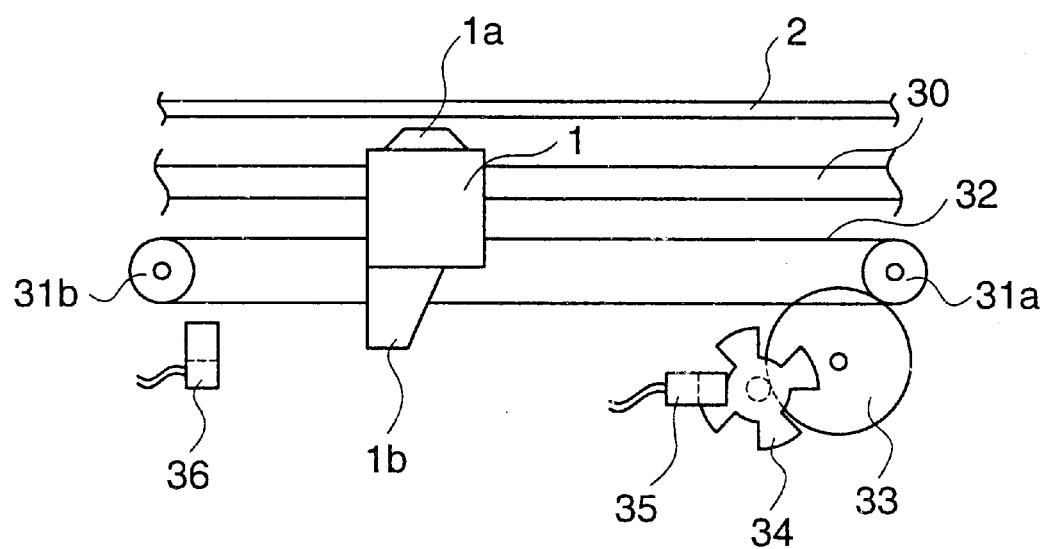
FIG. 3 is a cross-sectional review of the printing unit of the printing apparatus according to a preferred embodiment of the invention.

FIG. 3 is a cross-sectional view of the printing unit of the printing apparatus according to one embodiment of the invention.

The method of detecting a loss of synchronism in the head carriage drive motor is described with reference to FIG. 3.

Printer head 1 is fixed on head carriage 1b together with wire holder 1a. Head carriage 1b is driven reciprocally side to side by carriage transfer belt 32 and carriage drive gears 31a and 31b; carriage drive gear 31a is connected to a head carriage drive motor not shown in the figure. This motor is normally a pulse motor, and is a pulse motor in this embodiment. Carriage drive gear 31a drives rotating detector plate 34 via transfer gear 33. Rotating detector plate 34 is positioned so as to interrupt the detection beam of carriage detector 35, which is also a photo-interrupter. Carriage detector 35 detects the rotation of rotating detector plate 34 cause by the movement of head carriage 1b.

Note that rotating detector plate 34 is propeller-shaped, and when it rotates, the output of carriage detector 35 switches on/off on a regular period. More specifically, when head carriage 1b is driven reciprocally by the head carriage drive motor (not shown in the figure), the movement of head carriage 1b is detected by carriage detector 35.

If the receipt paper, journal paper, or slip paper between printer head 1 and platen 2 is wrinkled and caught between wire holder 1a and platen 2, a paper jam occurs. As a result, head carriage 1b no longer tracks rotation of the carriage drive motor, and the carriage drive motor loses synchronization. This loss of synchronization is detected by carriage detector 35, and indicated as a "carriage error."

A "home position" for printer head 1 is needed to determine a reference point for the print position. Home position detector 36 is also a photo-interrupter for detecting head carriage 1b. More specifically, when head carriage 1b moves to the left, the position at which the light beam from home position detector 36 is interrupted is the reference point for the home position.

When printer head 1 moves toward the home position, home position detector 36 can detect if printer head 1 does not reach the home position due to a paper jam or other factor. A home position error occurs when printer head 1 cannot be returned to the home position.

Figure 4:
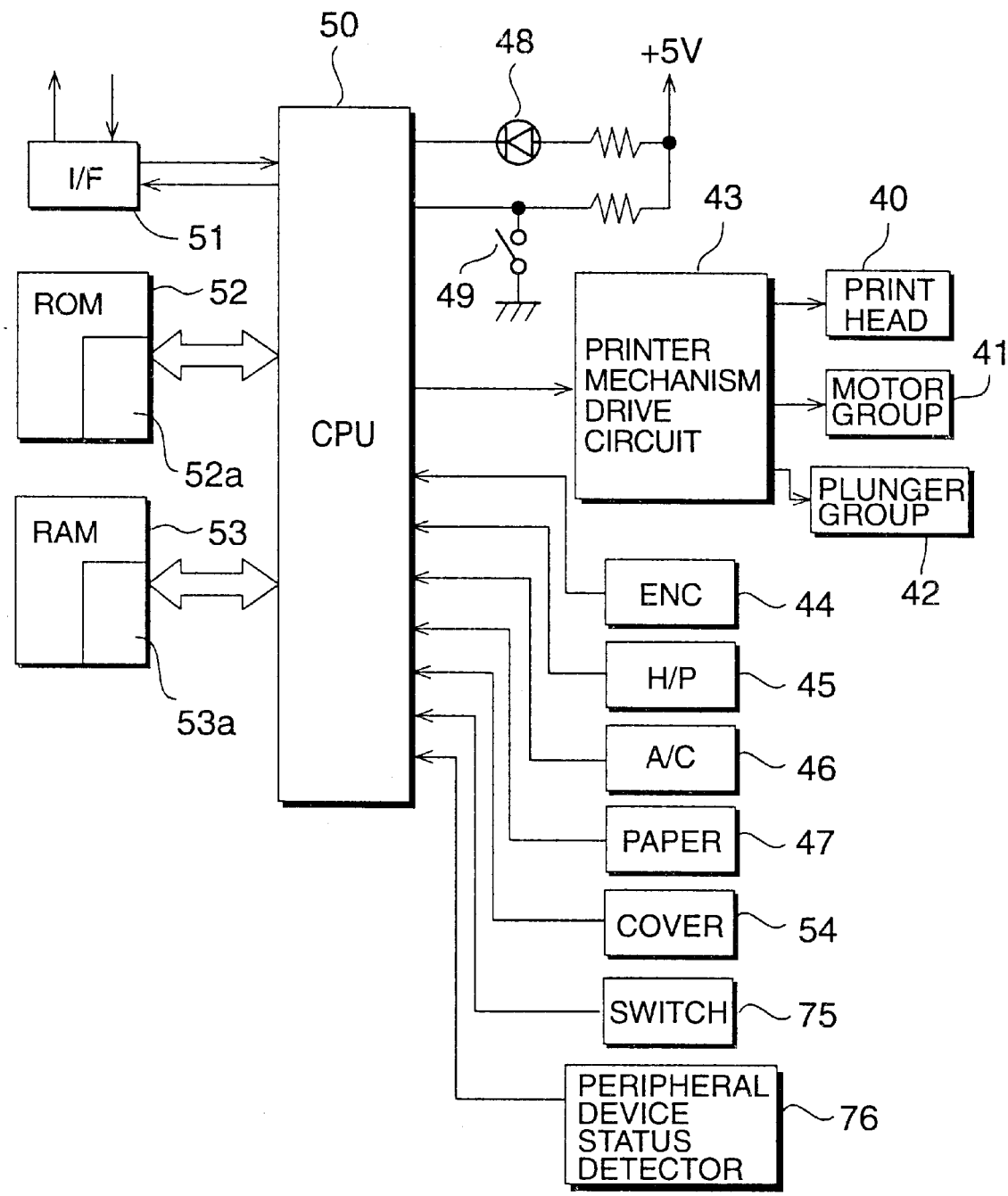
FIG. 4 is a block diagram of the control circuit achieving the present invention.

A circuit block diagram of the control circuit achieving the present invention is shown in FIG. 4.

The mechanism of the printing apparatus of the invention as described above is represented as print head 40, motor group 41, and plunger group 42 in FIG. 4; this printer mechanism is driven by printer mechanism drive circuit 43. The printer mechanism also comprises carriage detector 44, home position detector 45, automatic cutter detector 46, paper detectors 47, and cover detectors 54, each of which is connected to central processing unit (CPU) 50.

Automatic cutter detector 46 detects the position of cutter blade 14a (FIG. 2), drives the cutter blade drive motor (not shown in the figures), and generates the detector signal at a predetermined position. If a paper jam occurs in the cutter blades, the cutter blades will not move to the specified position, the detector signal will not be output, and an error is reported. This error is called a "cutter error."

Paper detectors 47 include near-end detector 20 (FIG. 1), and receipt paper detector 12 and slip paper detector 13 (FIG. 2).

Also connected to CPU 50, which controls the entire printing apparatus, are display device 48, typically an LED unit; panel switch 49 for manually advancing the paper; interface 51 for communications with the host computer; ROM 52 for storing the control program, print character patterns, and other static information; and RAM 53 providing the receiving buffer, print buffer, and other data buffers.

When print data is input from interface 51, the data is stored to the receiving buffer of RAM 53, and CPU 50 interprets the data, reads the character patterns corresponding to the data code from ROM 52, and drives print head 40, motor group 41, and plunger group 42 by means of printer mechanism drive control circuit 43 to print.

When a carriage error, home position error, cutter error, or other error occurs, CPU 50 can drive display device 48 to notify the user that an error has occurred.

Figure 5:
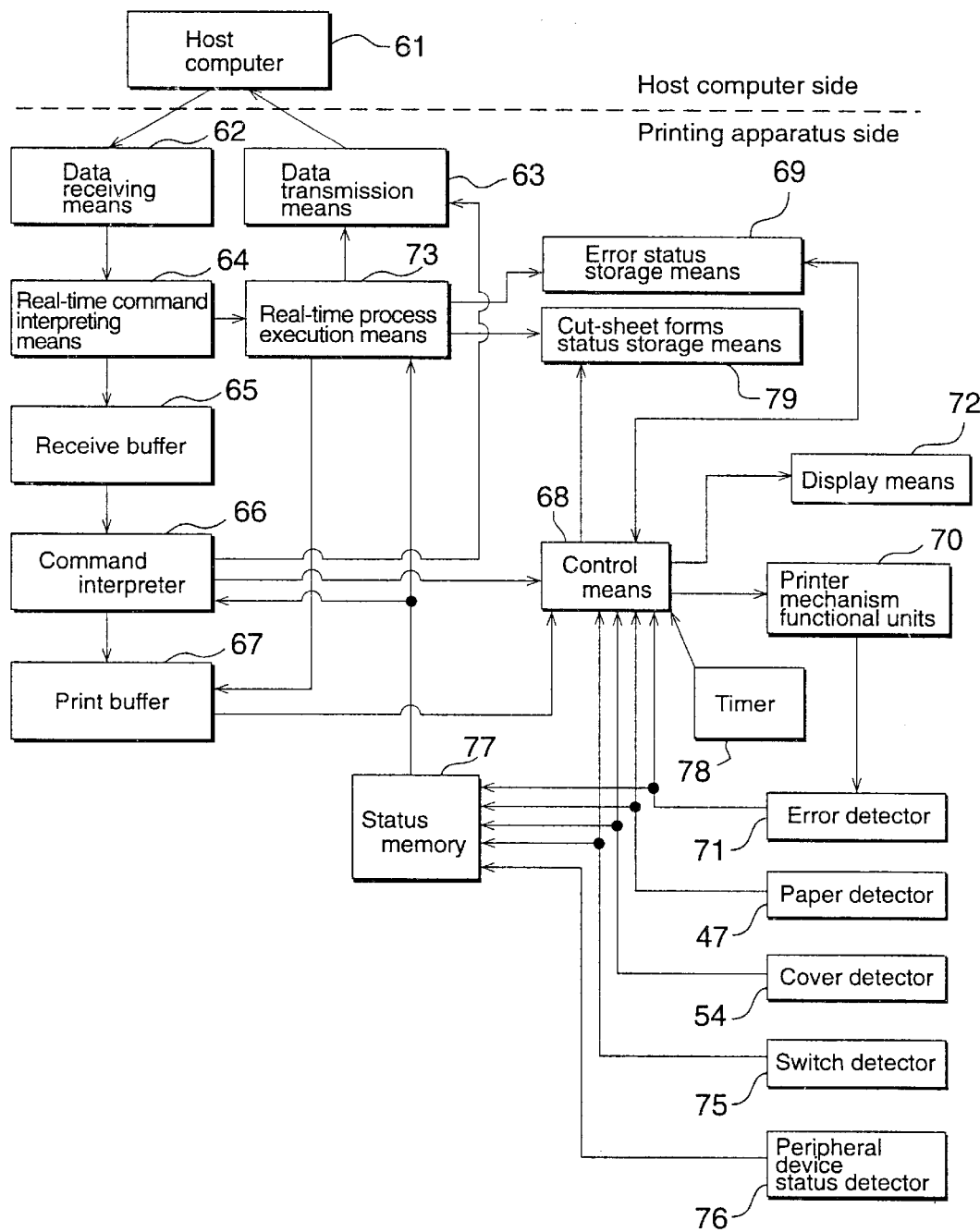
FIG. 5 is a functional block diagram used for describing the first embodiment of the invention.

FIG. 5 is a functional block diagram showing the overall mechanism of the invention, and the relationships between the various functional means.

Host computer 61 transmits the command data, print data, and other information to the printing apparatus. Data receiving means 62 receives the data codes from host computer 61 through interface 51, and is realized as an interrupt sequence activated by interface 51.

Real-time command interpreting means 64 interprets and executes the received data at the same time it is received, and the process is executed during the interrupt sequence together with data receiving means 62. Real-time command interpreting means 64 determines whether the received data is a real-time control command, and executes the specified process based on the command if the received data is determined to be a real-time control command.

Both real-time command interpreting means 64 and data receiving means 62 are realized by a microprocessor in the embodiment. The microprocessor functions are both real-time command interpreting means 64 and data receiving means 62 during the interrupt sequence. When the host system sends data to the printer, the interrupt sequence starts. The microprocessor receives the data in the former part of the interrupt sequence, and then it starts interpreting the data in the latter part of the sequence.

All received data passed through real-time command interpreting means 64 is stored temporarily in receiving buffer 65. The received data buffered to receiving buffer 65 is read one at a time by command interpreter 66, interpreted, and separated into print data and command data for controlling the printing apparatus. Command data is applied by control means 68 to execute the settings or operations corresponding to the command code. Print data is used to store the character patterns corresponding to the data codes to print buffer 67. When printing is then executed by control means 68, control means 68 reads the print pattern from print buffer 67, and controls printer mechanism functional units 70 to print.

The RS-232C two-way, serial interface is used as the interface in this embodiment because of its ability to maintain communications with the host computer even when the printing apparatus is off-line. With the standard RS-232C two-way, serial interface, the off-line status of off-line devices can be detected by other devices, but because several bytes of data may be loaded to the communication bus before data transmission can be stopped, it is necessary for the off-line device to receive this data even after it moves off-line. It is therefore necessary for the device to move off-line before the receiving buffer becomes full, thereby enabling data to be received and stored to the receiving buffer while the capacity remains even when an error occurs and the printing apparatus goes off-line. Data received after the receiving buffer becomes full, however, is thrown away.

With the first embodiment of the invention, however, received commands are interpreted by real-time command interpreting means 64, which is activated by a receive interrupt, before being stored in the receiving buffer. As a result, the command can be processed even if the transmitted data is not stored.

Real-time commands include commands requesting the status of the printing apparatus. When this printing apparatus status request is received, real-time command interpreting means 64 responds by sending the current printing apparatus status to host computer 61 through data transmission means 63. It remains possible to send the printing apparatus status even when an error occurs because data receiving means 62, data transmission means 63, and real-time command interpreting means 64 remain functional.

Ordinary POS and ECR systems include a cash drawer in which cash paid by customers and change is stored. In some applications of the printer of the embodiment, the cash drawer is placed under the printer. Thus, the printer is designed to connect to and drive the cash drawer in accordance with the command sent from a host device. The printer can also detect status of the cash drawer, namely open or closed state through peripheral device status detector 76.

When the received command is determined by command interpreter 66 to be a cut-sheet form selection command, control means 68 is notified. Control means 68 thus notifies display means 72 that a cut-sheet form was selected, displays a prompt that the printing apparatus is waiting for cut-sheet form insertion, and stores cut-sheet forms information in RAM 53 by means of cut-sheet forms status storage means 79 to indicate that a cut-sheet form was selected and that the cut-sheet form insertion wait-state was entered. When a cut-sheet form is selected, cut-sheet form detector 47 detects insertion of the cut-sheet form and notifies control means 68 when the form is inserted.

Control means 68 monitors the cut-sheet form wait-state information, and stops printing apparatus drive until either the cut-sheet form wait-state information is deleted or cut-sheet form insertion is detected. By control means 68 stopping printing apparatus operation, command interpreter 66 also stops without being able to activate control means 68, but real-time command interpreting means 64 continues to operate irrespective of the cut-sheet form wait-state.

Real-time commands include commands canceling the cut-sheet form wait-state. When this command is received, the cut-sheet form insertion wait-state information and cut-sheet form selection information stored to RAM 53 are deleted by real-time command interpreting means 64. When control means 68, which monitors the cut-sheet form insertion wait-state, recognizes that the cut-sheet form insertion wait-state information has been deleted, it cancels the cut-sheet form insertion wait-state, clears print buffer 67, and selects the default paper type. The cut-sheet form insertion wait-state can be canceled by a time-out, and control means 68 thus controls timer 78.

If a paper jam or other error occurs during printing, paper feeding, or paper cutting, an error is detected by error detector 71, control means 68 is notified, and the error information is stored to status memory 77. Control means 68 notifies display means 72 that an error has occurred, an error notice is displayed, and the error occurrence is stored as error information to RAM 53 by error status storage means 69.

Control means 68 monitors the error information, and stops operation of the printing apparatus until the error information is cleared. By control means 68 stopping printing apparatus operation, command interpreter 66 also stops without being able to activate control means 68, but real-time command interpreting means 64, which is activated by a receive interrupt from interface 51, continues to operate irrespective of the error. Because command interpreter 66 is stopped, however, the data received by interface 51 is simply stored to receiving buffer 65, and control means 68 therefore controls the interface to notify the host computer that the printing apparatus cannot accept anymore information (i.e., notifies the host computer that the printing apparatus is now off-line).

The real-time commands also include a 'recover from error' command. When this command is received, real-time command interpreting means 64 deletes the error information stored to RAM 53. When control means 68, which monitors this error status information, recognizes that the error information was deleted, it reactivates the printing apparatus to resume printing.

Another 'recover from error' command is a command to resume printing after deleting all previously received data. When this command is received, receiving buffer 65 and print buffer 67 are cleared by real-time command interpreting means 64, and the error information stored in RAM 53 is then deleted.

The printing apparatus also goes off-line when a no-paper state is detected by cut-sheet form detector 47, when an open-cover state is detected by cover detector 54, and when a manual form feed caused by the form feed switch is detected by switch detector 75. These states are stored to status memory 77, and the information is reported to host computer 61 by real-time command interpreting means 64.

Figure 6:
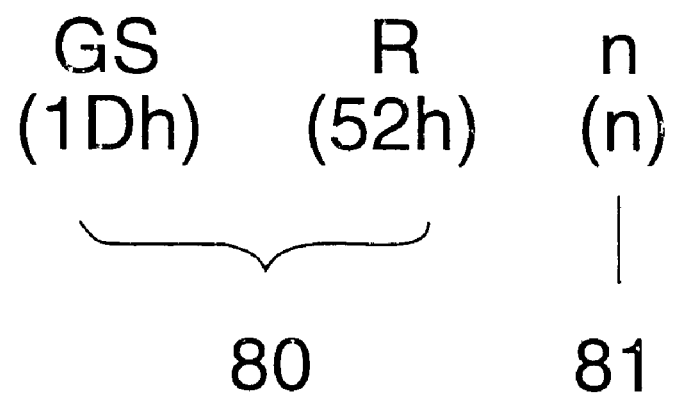

FIG. 6 shows the command code for real-time commands in the present embodiment. Referring to FIG. 6, received data [GS], [R], and [n] are each one byte long, expressed as 1D, 52, and n in hexadecimal code. [GS] and [R] indicate a real-time command; what is executed is selected according to the value of [n].

The values of [n] and what is executed for each [n] value in this embodiment are shown in Table 1.

TABLE 1

| n | What is executed |
|---|---|
| 0 | Send printer status. |
| 1 | Send the cause of the off-line state. |
| 2 | Send the cause of the error. |
| 3 | Send the status of the continuous forms detector. |
| 4 | Send the status of the slip paper detector and slip paper. |
| 5 | Send the status of the validation paper detector and validation paper. |
| 6 | Cancel cut-sheet form insertion wait-state. |
| 7 | Recover from error (resume printing). |
| 8 | Recover from error (clear buffers). |

When [n]=0, the printing apparatus status byte (one byte) shown in Table 2 is sent to the host computer.

TABLE 2 n = 0: printer status

| Bit | Function | Value 0 | 1 |
|---|---|---|---|
| 0 | Reserved | Fixed to 0 | |
| 1 | Reserved | Fixed to 1 | |
| 2 | Drawer kick connector | 0 | 1 |
| 3 | On-line/off-line status | on-line | off-line |
| 4 | Reserved | Fixed to 1 | |
| 5 | Undefined | | |
| 6 | Undefined | | |
| 7 | Reserved | Fixed to 0 | |

The drawer status, and printing apparatus on-line/off-line status can be determined by the host computer based on the printing apparatus status information. When the printing apparatus is off-line, more specific off-line information can be obtained by setting [n] to 1.

When [n]=1, the off-line information byte (one byte) shown in Table 3 is sent to the host computer.

TABLE 3 n = 1: off-line cause status

| Bit | Function | Value 0 | 1 |
|---|---|---|---|
| 0 | Reserved | Fixed to 0 | |
| 1 | Reserved | Fixed to 1 | |
| 2 | Cover status | Closed | Open |
| 3 | Form feed by form feed switch | Form feed not in progress | Form feed in progress |
| 4 | Reserved | Fixed to 1 | |
| 5 | No paper: printing stopped | Printing not stopped | Printing stopped |
| 6 | Error status | No error | Error generated |
| 7 | Reserved | Fixed to 0 | |

The host computer can thus evaluate the off-line information, and can post prompts or other appropriate information to the user based on the evaluation result. If an error is determined to have occurred, detailed error information can be obtained by resetting [n] to 2.

When [n]=2, the error information byte (one byte) shown in Table 4 is sent to the host computer.

TABLE 4 n = 2: error cause status

| Bit | Function | Value 0 | 1 |
|---|---|---|---|
| 0 | Reserved | Fixed to 0 | |
| 1 | Reserved | Fixed to 1 | |
| 2 | Mechanical error | No error | Error generated |
| 3 | Automatic paper cutter error | No error | Error generated |
| 4 | Reserved | Fixed to 1 | |
| 5 | Non-recoverable error | No error | Error generated |
| 6 | Auto-recover error | No error | Error generated |
| 7 | Reserved | Fixed to 0 | |

The mechanical errors shown in Table 4 refer primarily to errors due to a paper jam, but also include carriage errors and home position errors. These are further distinguished as paper jams around the printer head, and automatic paper cutter errors, thereby enabling the host computer to distinguish between paper jams occurring around the printer head, and in the automatic paper cutter. Based on this determination, the user is appropriately notified using the display means of the host computer where the error occurred, thus facilitating removal of the paper jam.

Printing can be resumed when paper jam errors and similar errors occur by removing the paper jam or other error cause. Errors can also occur as a result of external power supply problems, damage to the printer head temperature detector, and other causes making resumption of printing difficult, and it is necessary to distinguish these non-recoverable errors from recoverable errors (from which printing can be resumed). Errors other than paper jam errors are therefore identified as non-recoverable errors by setting bit 5.

When [n]=3, the continuous paper (incl. journal and receipt paper) detector information byte (one byte) shown in Table 5 is sent to the host computer.

TABLE 5 n = 3: continuous paper detector status

| Bit | Function | Value 0 | 1 |
|---|---|---|---|
| 0 | Reserved | Fixed to 0 | |
| 1 | Reserved | Fixed to 1 | |
| 2 | Journal near-end detector | Paper loaded | No paper |
| 3 | Receipt near-end detector | Paper loaded | No paper |
| 4 | Reserved | Fixed to 1 | |
| 5 | Journal end detector | Paper loaded | No paper |
| 6 | Receipt end detector | Paper loaded | No paper |
| 7 | Reserved | Fixed to 0 | |

When [n]=4, the slip paper detector information byte (one byte) shown in Table 6 is sent to the host computer.

TABLE 6 n = 4: slip status

| Bit | Function | Value 0 | 1 |
|---|---|---|---|
| 0 | Reserved | Fixed to 0 | |
| 1 | Reserved | Fixed to 1 | |
| 2 | Slip paper selection | Selected | Not selected |
| 3 | Slip paper insertion wait-state | Waiting | Not waiting |
| 4 | Reserved | Fixed to 1 | |
| 5 | Slip paper detector | Paper loaded | No paper |
| 6 | | | |
| 7 | Reserved | Fixed to 0 | |

It is possible to determine from this slip status byte shown in Table 6 whether slip paper is selected or whether continuous or validation paper is selected. It is also possible to determine when slip paper is selected whether the printing apparatus is waiting for slip paper insertion, or whether the paper has already been loaded and printing can proceed.

When [n]=5, the validation paper detector information byte (one byte) shown in Table 7 is sent to the host computer.

TABLE 7 n = 5: validation status

| Bit | Function | Value 0 | 1 |
|---|---|---|---|
| 0 | Reserved | Fixed to 0 | |
| 1 | Reserved | Fixed to 1 | |
| 2 | Validation paper selection | Selected | Not selected |
| 3 | Validation paper insertion wait-state | Waiting | Not waiting |
| 4 | Reserved | Fixed to 1 | |
| 5 | Validation paper detector | Paper loaded | No paper |
| 6 | | | |
| 7 | Reserved | Fixed to 0 | |

It is possible to determine from this validation status byte shown in Table 7 whether validation paper is selected or whether continuous or slip paper is selected. It is also possible to determine when validation paper is selected whether the printing apparatus is waiting for validation paper insertion, or whether the paper has already been loaded and printing can proceed.

The real-time command data receiving means and real-time command interpreting means are described below with reference to FIGS. 7 and 8.

Figure 7:
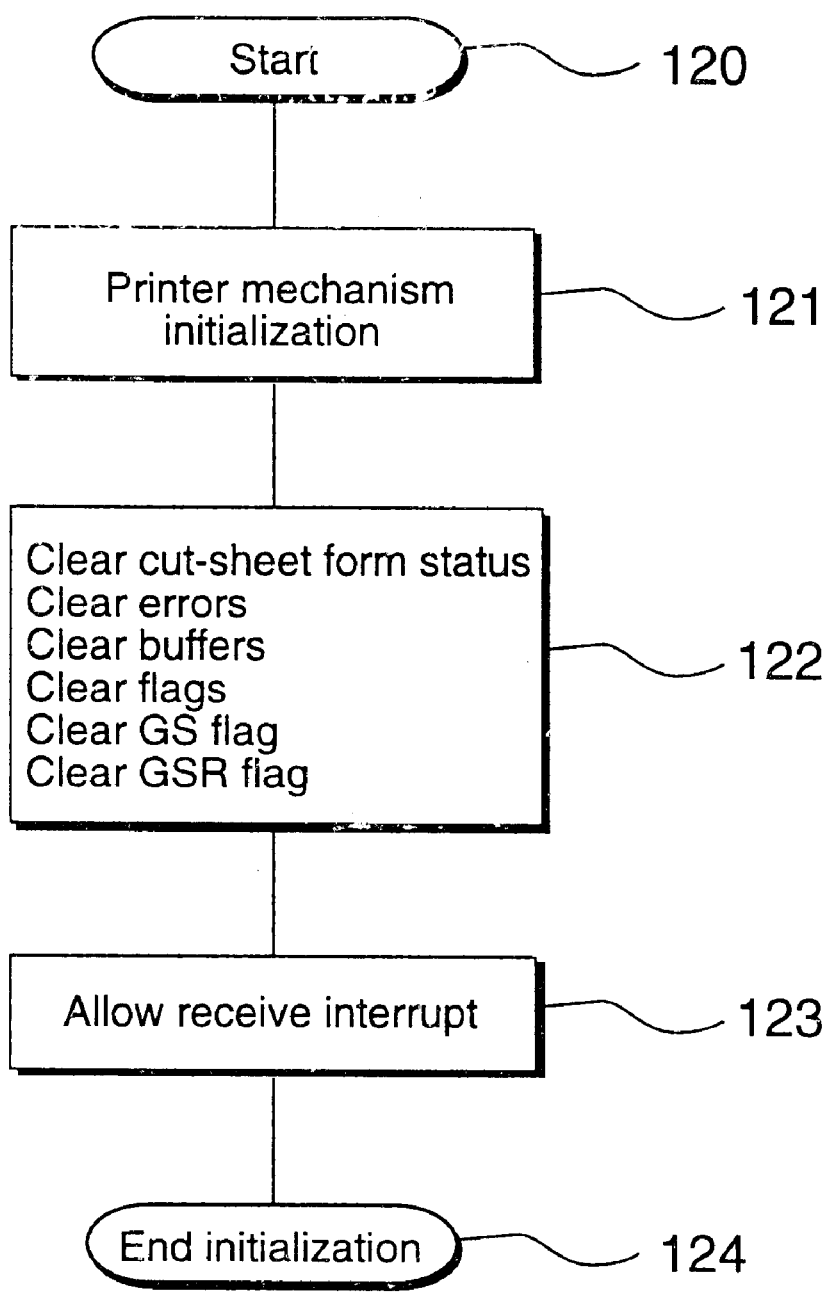
FIG. 7 is a flow chart of a control method applied by the printing apparatus according to the first embodiment of the invention.

FIG. 7 shows the printing apparatus initialization process, which starts immediately after the power is turned on (step 120). During this initialization, the printing mechanism is initialized (step 121), and all information in RAM 53 is initialized, including the cut-sheet form status flag, error information, clear-buffer flag, GS flag, and GSR flag (step 122). The clear-buffer flag, GS flag, and GSR flag are used in the receive interrupt process, and are used by the real-time command interpreting means. The real-time command interpreting means is included in the receive interrupt process caused by the data transfer requirement of the host device. The clear buffers flag is set by the real-time command interpreting means and checked by the received data cancellation means. The other flags, namely the GS and GSR flags, are used only in the interrupt process to change the operation state of the real-time command interpreting means. Since real-time commands are composed of 3 bytes and the receive interrupt process is caused by each byte reception, the real-time interpreting means must change its state in accordance with the received data. In the final step 124, interface receive interrupts are enabled, and the initialization process is ended (step 124).

Figure 8:
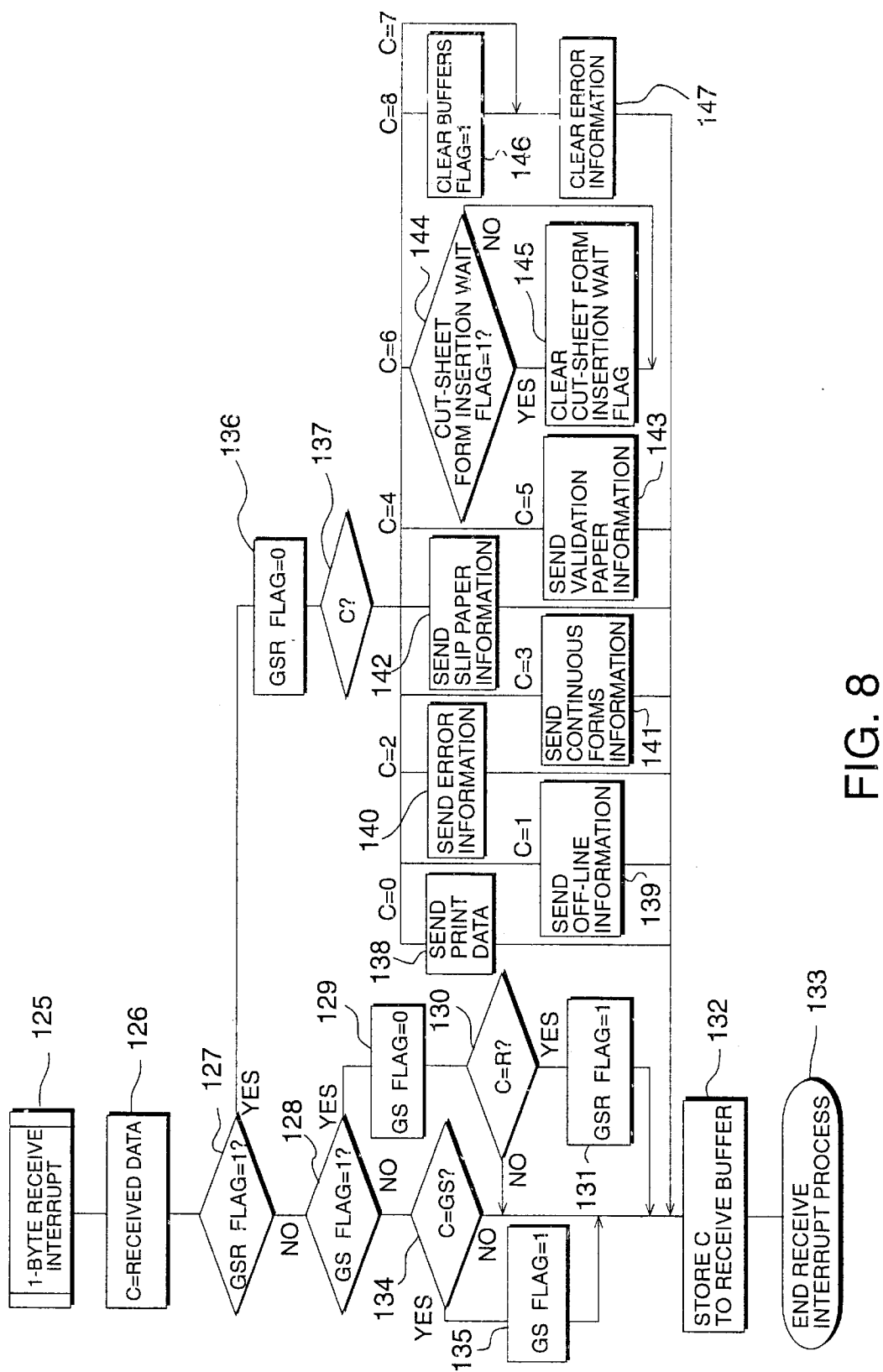
FIG. 8 is a flow chart of a control method applied by the printing apparatus according to a the first embodiment of the invention.

FIG. 8 shows the interface receive interrupt process, as well as the data receiving means and the real-time command interpreting means. The data received from the host computer through the interface is received one byte at a time, and the process shown in FIG. 8 is executed for every byte received. Because the real-time commands comprise three bytes, [GS], [R], and [n], as shown in FIG. 6, the real-time command is controlled by the GS flag, which is set when the [GS] byte is received; the GSR flag, which is set when the [R] byte is received when the GS flag is set; and the [n] byte received when the GSR flag is set. There is also a clear-buffer flag, which stores whether the buffer is cleared according to the value of [n].

Data is received and the receive interrupt is activated at step 125. At step 126, the received data is read from the interface, and at step 127 it is determined whether the GSR flag is set. If the GSR flag is set, i.e., if the [GS] and [R] bytes have already been received, the received data ("C" in this example) is processed with the value of [n]. The GSR flag is cleared at step 136, and the following operation is executed based on the value of the received data (C) (step 137).

If C=0, the printer information stored in RAM 53 is sent through the interface to the host computer by data transmission means 63 (step 138).

If C=1, the off-line information stored in RAM 53 is sent through the interface to the host computer by data transmission means 63 (step 139).

If C=2, the error information stored in RAM 53 is sent through the interface to the host computer by data transmission means 63 (step 140).

If C=3, the continuous paper information stored in RAM 53 is sent through the interface to the host computer by data transmission means 63 (step 141).

If C=4, the slip information stored in RAM 53 is sent through the interface to the host computer by data transmission means 63 (step 142).

If C=5, the validation information stored in RAM 53 is sent through the interface to the host computer by data transmission means 63 (step 143).

Figure 9:
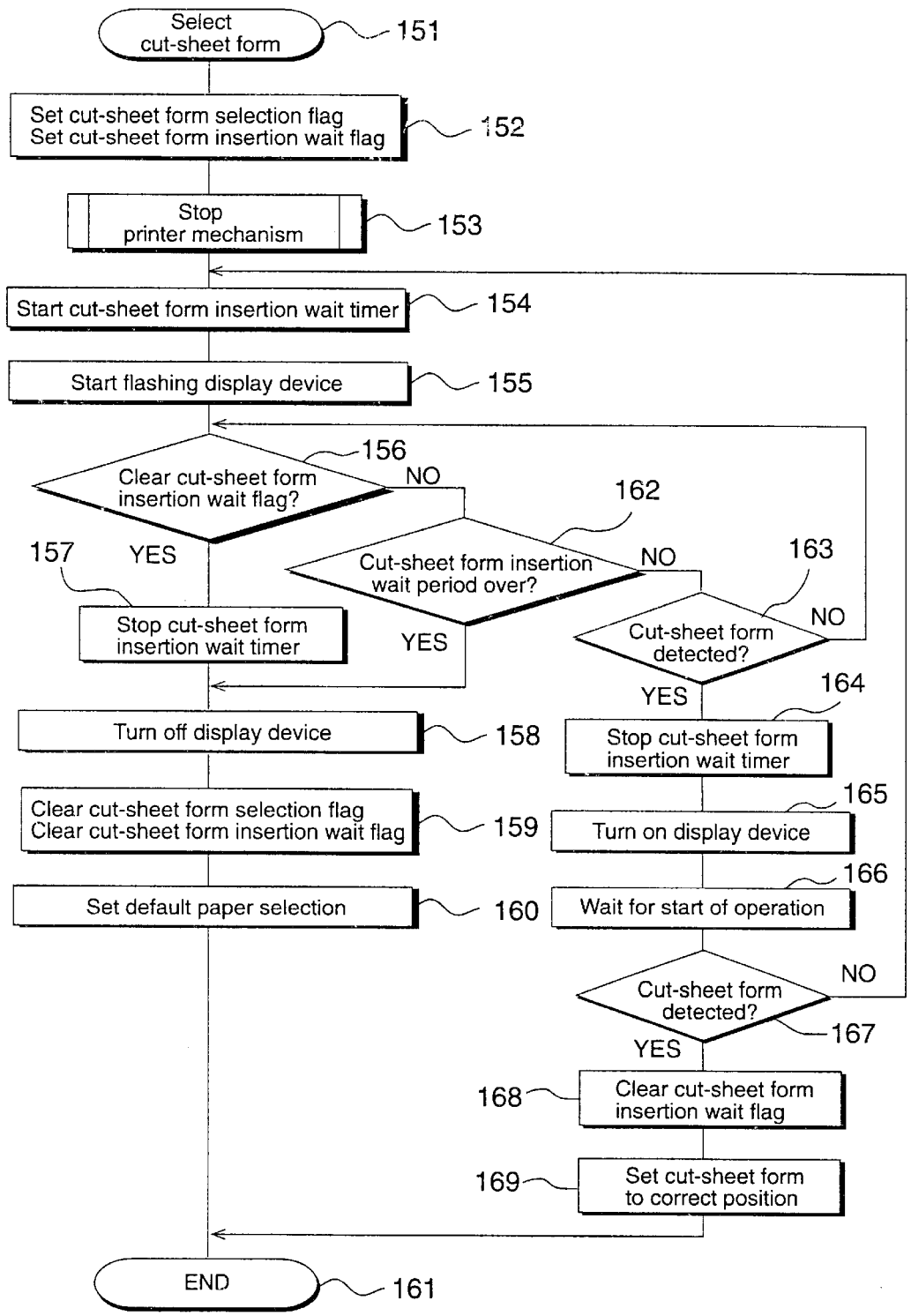
FIG. 9 is a flow chart of a control method applied by the printing apparatus according to the first embodiment of the invention.

If C=6, it is determined whether the cut-sheet form insertion wait-state is set (step 144), and if so, the cut-sheet form wait flag is cleared (step 145). As shown in FIG. 9, the system can recover from the cut-sheet form insertion wait-state by clearing the cut-sheet form wait flag.

Figure 10:
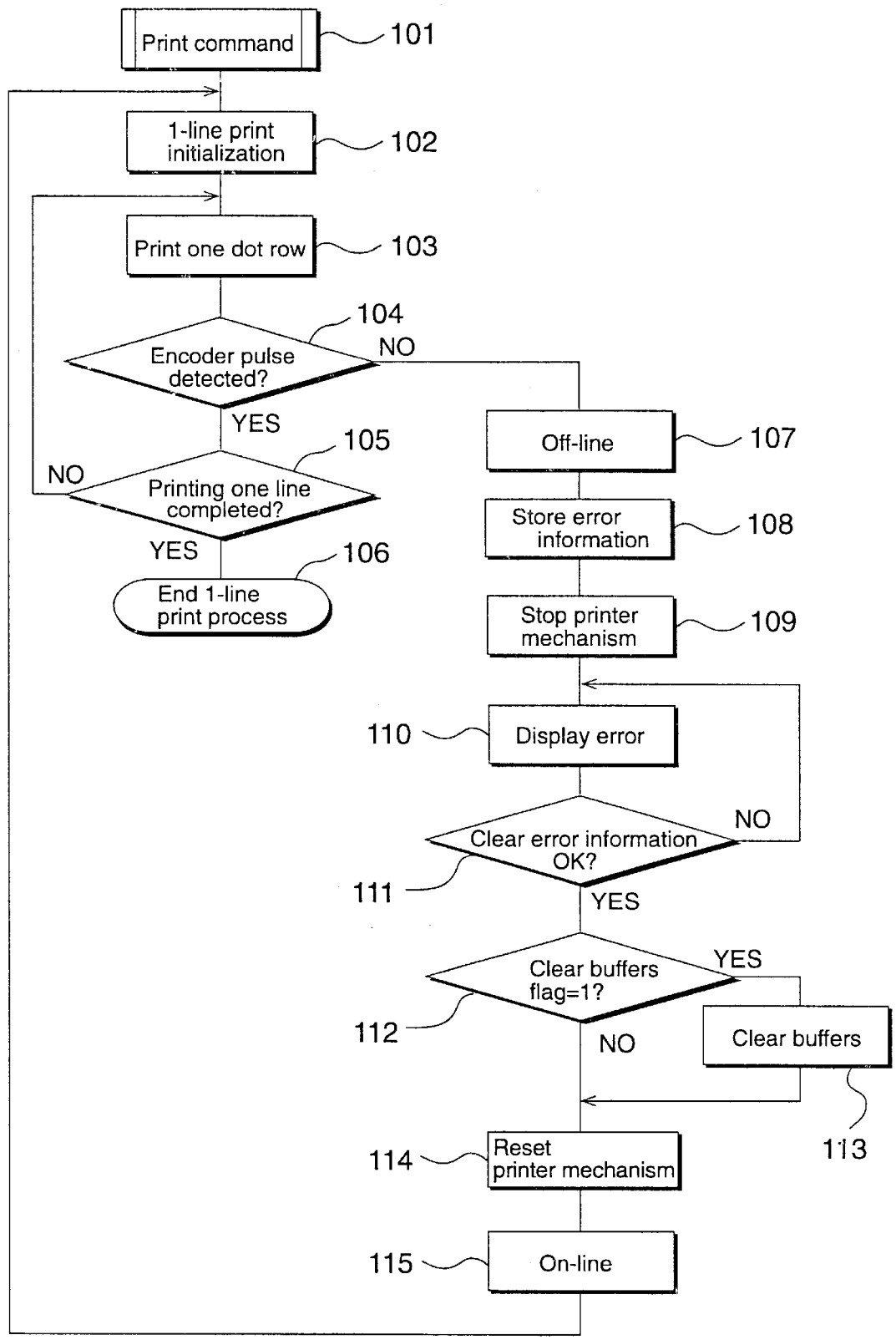
FIG. 10 is a flow chart of a control method applied by the printing apparatus according to the first embodiment of the invention.

If C=8, the clear-buffer flag is set (step 146), and the error information in RAM 53 is cleared (step 147). When the clear-buffer flag is cleared, the receiving buffer and print buffer are both cleared as shown in FIG. 10 after error recovery. If C=7, the error information is simply cleared (step 147).

The received data is also temporarily stored in the receiving buffer even if the data is a real-time command (step 132).

If the GSR flag is cleared in step 127, it is determined in step 128 whether the GS flag is set. Specifically, if the data has been received through the [GS] byte, the GS flag is set; the GS flag is therefore cleared in step 129, and it is determined whether the received data (C) is the [R] byte (step 129). When the data received immediately before this data is [GS] byte, the [GS] flag has been set in step 135 in the previous receive interrupt process. In other words, the [GS] flag indicates that the data received immediately before this data is [GS] byte. If C=[R], the GSR flag is set (step 131), and the received data is stored to the receiving buffer (step 132).

If the GS flag is cleared in step 128, it is determined in step 134 whether the received data (C) is the [GS] code. If C=[GS], the GS flag is set; if not, the data is stored directly to the receiving buffer (step 132), and the receive interrupt process is ended (step 133).

The operation of the control means for setting cut-sheet forms is described next with reference to FIG. 9. Shown in FIG. 9 are the process from selection of cut-sheet form printing to loading the paper, and the process for canceling the cut-sheet form print mode selection.

This process starts (step 151) when command interpreter 66 determines that the input command is the cut-sheet form selection command, thus causing command interpreter 66 to set the cut-sheet form selection flag, and the cut-sheet form insertion wait flag (step 152). After confirming that mechanical operations are stopped (step 153), cut-sheet form insertion wait timer 78 is activated, and display device 48 is set flashing by display means 72 (step 155). In step 156 it is determined whether the cut-sheet form insertion wait flag is cleared; if so, i.e., if the cut-sheet form insertion wait-state is canceled by real-time command [GS] [R] [6], the cut-sheet form insertion wait timer 78 is stopped (step 157), and display device 48 is turned off by display means 72 (step 158). The cut-sheet form selection flag and cut-sheet form insertion wait flag are then cleared (step 159), the paper corresponding to the default paper type setting is set (step 160), and the cut-sheet form selection process is ended (step 161).

If the cut-sheet form insertion wait flag is not cleared in step 156, it is determined if the cut-sheet form insertion wait period has passed (step 162); if the cut-sheet form insertion wait period has passed, the procedure skips forward to step 158.

If the cut-sheet form insertion wait period has not passed in step 162, it is determined in step 163 whether the cut-sheet form is inserted. If the cut-sheet form is not inserted, the procedure loops back to step 156 to determine again whether the cut-sheet form insertion wait flag is cleared. The procedure then determines again whether the cut-sheet form insertion wait flag is cleared, whether the cut-sheet form insertion wait period has passed, and whether the cut-sheet form is inserted.

If it is determined in step 163 that the cut-sheet form was inserted, the cut-sheet form insertion wait timer 78 is stopped (step 164), display device 48 is turned on (step 165), and the start-operation standby period is waited (step 166). If it is determined in step 167 that the cut-sheet form is not inserted, the procedure loops back to step 154, and the above operation is repeated.

If it is determined in step 167 that the cut-sheet form is loaded, the cut-sheet form insertion wait flag is cleared (step 168), the cut-sheet form is set to the correct position (step 169), and the cut-sheet form selection process ends (step 161).

As described hereinabove, by providing a data receive means and a real-time command interpreting means in the receive interrupt process, it is possible to interpret commands and cancel the cut-sheet form wait-state even when the printing apparatus is stopped due to a cut-sheet form insertion wait-state.

A means of detecting carriage errors is described below as an embodiment of the invention for detecting errors with reference to FIG. 10.

The process is started in step 101 by the print command, and the printing apparatus is initialized for one line in step 102. The line is then printed from steps 103 to 105. In step 103, one dot row is printed and the printer carriage is advanced one dot row. In step 104, it is determined whether a detector pulse was output from carriage detector 35 due to carriage movement; the detector pulse is usually output on a regular cycle if the carriage advances normally. In step 105, it is determined whether printing the one line is completed; if not, the procedure loops back to step 103. If the one row is completed, the procedure then ends at step 106.

If the carriage is stopped at this time due to, for example, a paper jam, the detector pulse is not detected at step 104, and the procedure branches to step 107. The procedure from step 107 is the process executed when a carriage error occurs, and the first step (step 107) is to notify the host computer that the printing apparatus cannot receive further communication data, i.e., that it is off-line. That a carriage error has occurred is then stored to RAM 53 in step 108. Because a carriage error is a recoverable error, the error is stored as a recoverable error. The printer mechanism is also stopped in step 109.

That an error occurred is then displayed (step 110) by the error display device until it is determined in step 111 that the error information has been deleted. If a real-time command is received, the error information is deleted, and it is determined in step 112 whether the received command indicates a clear buffer operation. If a clear buffer command has been received, the buffer is cleared in step 113; the buffers cleared at this time are both the receiving buffer and print buffer. According to FIG. 8, one of the real-time commands whose code is described as [GS [R] [7] causes the error state flag resetting means to clear the error information without clearing buffers, and another real-time command of [GS] [R] [8] causes the error state flag resetting means to do the same thing and the received data cancellation means to clear buffers.

A printer mechanism reset operation is then executed in step 114, and the host computer is notified in step 115 that the printing apparatus can again receive data, i.e., is again on-line.

By thus including a data receive means and real-time command interpreting means within the receive interrupt process, it is possible to continue interpreting commands when the printing apparatus stops due to an error, and recovery from errors is therefore also possible.

Control of the printing apparatus as seen from the host computer is described next.

Figure 11:
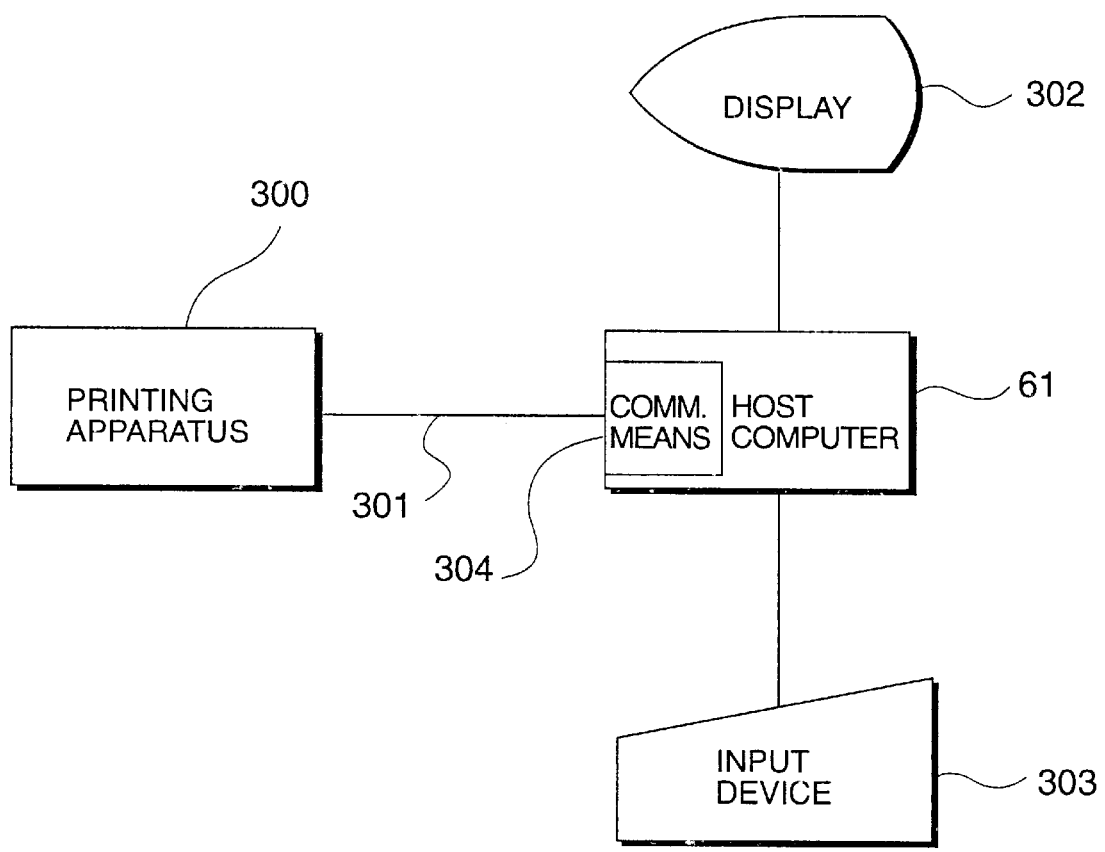
FIG. 11 a conceptual diagram of the data processing apparatus of the invention.

FIG. 11 is a conceptual diagram of the data processing apparatus of the invention in which printing apparatus 300 is connected with host computer 61 by means of an RS-232C communication cable 301. Host computer 61 comprises an internal communication means 304 and an RS-232C interface control circuit. A CRT or other display device 302, and keyboard or other input device 303 are also connected to host computer 61.

Figure 12:
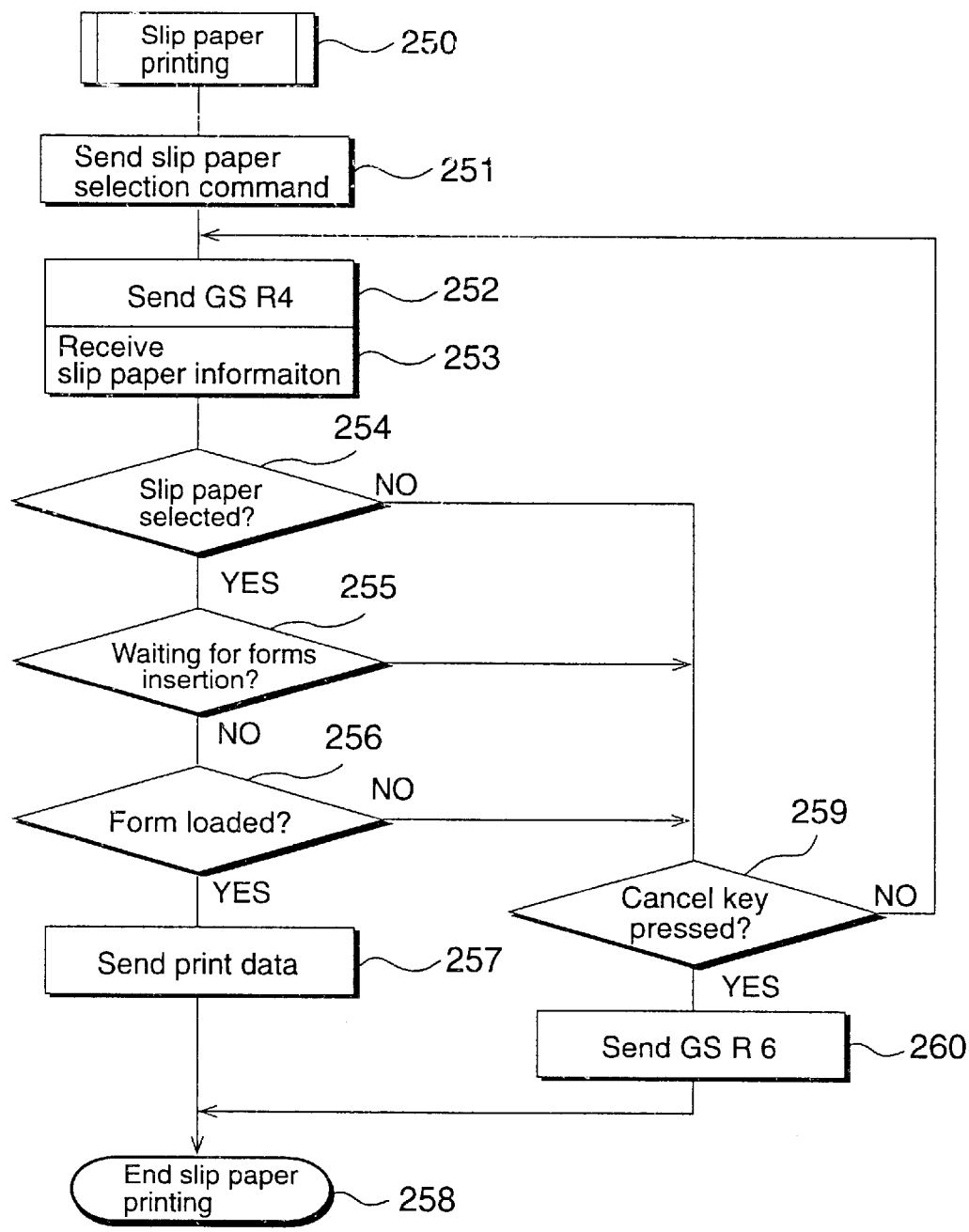
FIG. 12 is a flow chart of a control method applied by a host computer using a printing apparatus according to a preferred embodiment of the invention.

FIG. 12 is a flow chart of the control process of the host computer allowing cancellation of the cut-sheet form wait-state. Printing to slip paper is used as an example of cut-sheet form printing in FIG. 12.

When slip paper printing is selected (step 250), the slip paper selection command is output (step 251). Real-time command [GS] [R] [4] is then sent to determine the slip paper status (step 252), and the corresponding response is received (step 253). This response contains the information shown in Table 6. Based on this information, the host computer determines whether slip paper was selected (step 254).

If slip paper was selected, it is determined based on the information from step 253 whether the printing apparatus is waiting for slip paper insertion (step 255). If it is not waiting, it is first determined whether the slip paper is loaded (step 256); if so, the print data is output (step 257), and slip paper printing is completed (step 258).

If step 255 returns that the printing apparatus is waiting slip paper insertion, the host computer monitors a specific key in input device 303, e.g., a "cancel slip paper" key, and determines whether this key is pressed (step 259). This key is specifically assigned the "cancel slip paper wait-state" function, and is operated by the user.

If the key is pressed, the "cancel slip paper wait-state" command [GS] [R] [6] can be output to cancel the slip paper wait-state (step 260).

It is also possible to terminate slip paper printing (step 259) by monitoring this key when slip paper is not selected (step 254) and when there is no paper (step 256). In these cases, sending the "cancel slip paper wait-state" command [GS] [R] [6] (step 260) will be ignored because the printing apparatus is not in the cut-sheet form insertion wait-state. If the key is not pressed, the process loops back to step 252, and the host computer waits for slip paper selection (step 254) or until the slip paper is loaded (step 256). In step 254, the host system confirms that the slip mode is selected after sending the slip selection command in step 251, because the command may be stored in the command buffer and may not have been executed yet. Even if the slip mode has not been selected, the slip printing can be canceled by sending GS R 6 command to the printer of the embodiment. In that case, the printer will delete the slip selection command in the command buffer. In step 256, print paper presence is checked only for confirmation. Usually, print paper absence can hardly be detected in step 256 because the slip wait-state has been judged as false in step 255 indicating that the print paper has once been detected before the step. The slip absence condition can occur if the slip paper is pulled out after being inserted once.

Figure 13:
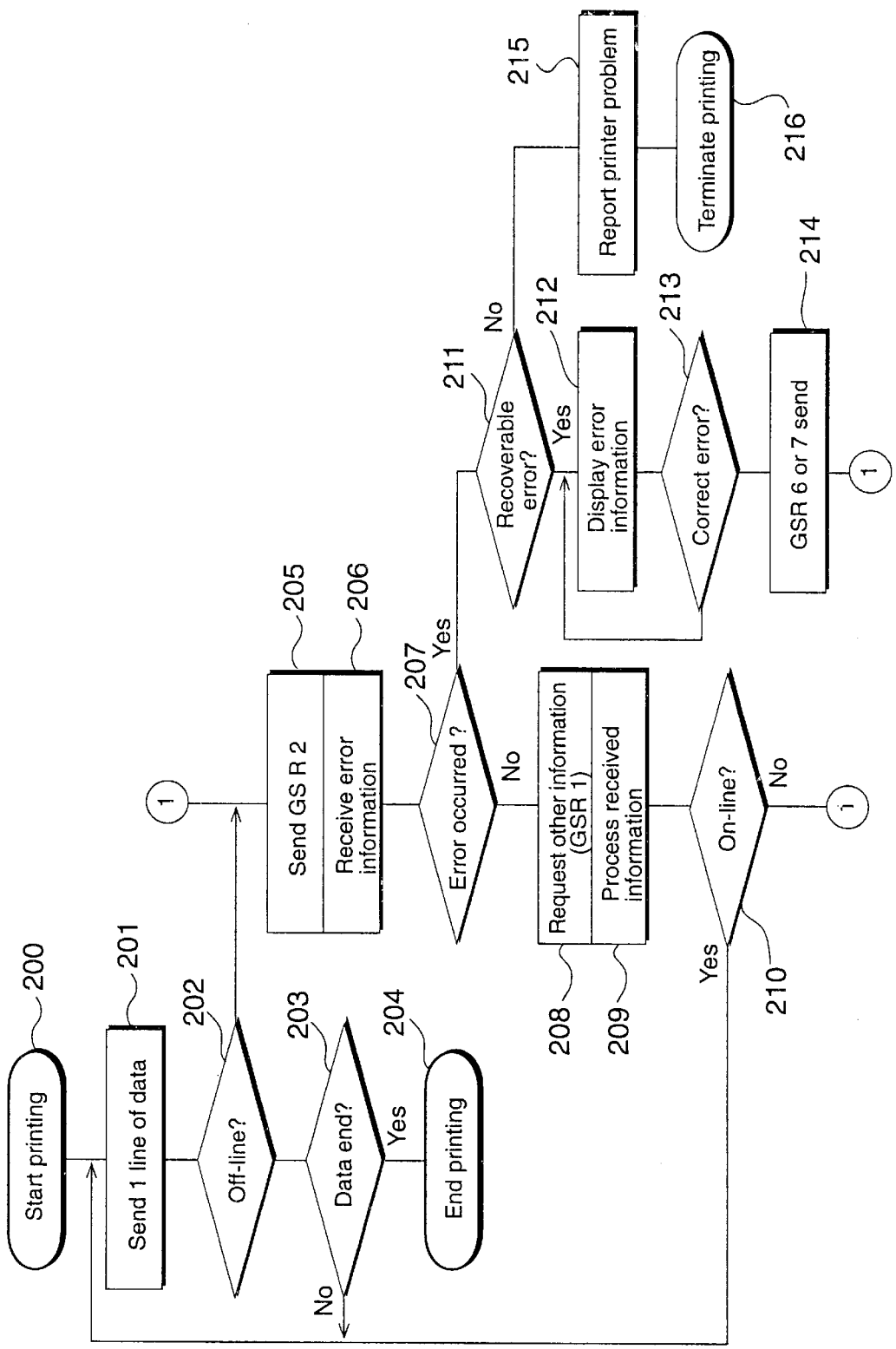
FIG. 13 is a flow chart of a control method applied by a host computer using a printing apparatus according to the first embodiment of the invention.

FIG. 13 is a flow chart of the printing process in the host computer allowing for error recovery.

After printing starts (step 200), the host computer checks whether the printing apparatus is still on-line (step 202) after each line of print data is sent to the printing apparatus (step 201). In general, it is possible to determine with the RS-232C interface whether the receiving side (the printing apparatus in this case) is on-line from the CTS (Clear To Send) signal, the DSR (Data Set Ready) signal, or the XOFF code. If the printing apparatus is on-line, the host computer continues to send the print data. If there is no more print data (step 203), printing ends (step 204).

If in step 202 the printing apparatus is off-line, it is possible that an error has occurred in the printing apparatus, or that printing has been disabled by some other factor (e.g., there is no more printing paper). To determine whether an error has occurred, the host computer sends real-time command [GS] [R] [2] in step 205. The response to this command is received in step 206, and used to determine (in step 207) whether an error occurred.

If an error did not occur, the printing apparatus may be off-line for some reason other than an error; this reason is therefore investigated (step 208), and the appropriate action is taken (step 209). To determine this reason, the host computer outputs real-time command [GS] [R] [1], and receives in response information that, for example, the cover is open or that there is no paper. The host computer can then display a user prompt such as "please close the cover" or "please add paper" on display device 302 to aid the user in correcting the problem.

This sequence is repeated until the printing apparatus comes on-line again (step 210), at which point printing is resumed from step 201.

If step 207 determines that an error has occurred, it is determined whether the error is recoverable (step 211); this determination is based on the bit 5 value shown in Table 4. If the error is recoverable, the user is notified that an error has occurred, and can be requested to check the expected cause of the error, e.g., a paper jam. The location of the paper jam can also be reported to the user as being in the carriage or the automatic paper cutter based on the state of bits 2 and 3 in Table 4. After the user corrects the paper jam, the user confirms that the cause of the error has been corrected using input device 303 (e.g., a keyboard) of the host computer (step 213). Real-time command [GS] [R] [6] or [7] is then output to reset the printing apparatus from the error. Because it is possible that the user has not completely corrected the cause of the error, or that plural errors occurred simultaneously, the process after error recovery will preferably resume from step 205 to check again for errors.

If step 211 determines that the error is non-recoverable, there is a problem in the printing apparatus that may not be correctable by the user. In this case, the user is informed that there is a problem in the printing apparatus (step 215), and printing is stopped (step 216).

In a data processing apparatus such as POS and ECR terminals where monetary transactions are handled, data loss and duplication are impermissible. When an error occurs in the printing apparatus, it is important to recover from the error without destroying the data already received, and to resume printing. However, to maintain compatibility with data processing apparatuses using conventional printing apparatuses, a mode for recovering after deleting the already received data is also enabled, and this mode can be selected by a control command from the host computer. More specifically, in data processing apparatuses using conventional printing apparatuses, the data already received is always destroyed after the printing apparatus recovers from the error. When the same data is printed after error recovery as before the error occurred, a special character is printed at the beginning of the line to indicate that the data in that line has been printed twice. A mode for error recovery after destroying the data already received is therefore necessary to maintain compatibility with this operation.

By means of the invention thus described, the host computer can determine why the printing apparatus has gone off-line while the printing apparatus is off-line.

Furthermore, by providing a data receiving means and real-time command interpreting means in the receive interrupt process, commands can be interpreted and recovery from a cut-sheet form insertion wait-state is possible even during the cut-sheet form insertion wait-state.

In addition, when the cause of the off-line status is an error, the host computer can determine whether the error is recoverable; if it is recoverable, the user can be notified where the error occurred, and printing can be resumed without destroying the data already received once the cause of the error is corrected.

When recovering from an error, it is also possible to choose to resume printing after destroying the data already transmitted to the printing apparatus, or to resume printing from the line at which the error occurred.

As a result, it is possible to provide a printing apparatus featuring high reliability and a high throughput rate; to provide a user-friendly printing apparatus reducing the host computer overhead; and to provide a data processing apparatus using said printing apparatuses for use as a printing apparatus used in monetary transactions in the distribution industry.

Second Embodiment

A second embodiment of the invention is described below with reference to the accompanying figures.

Figure 14:
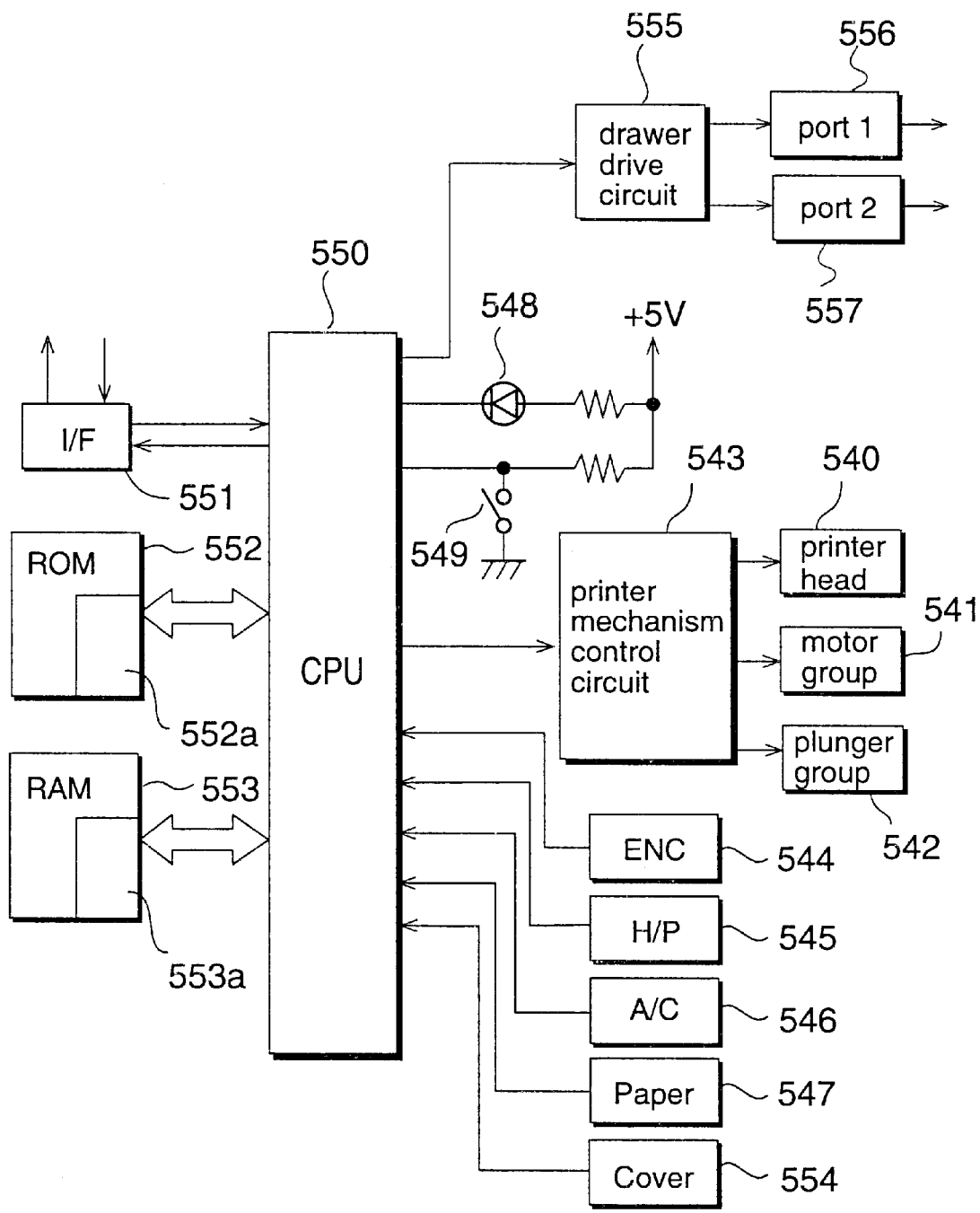
FIG. 14 is a circuit block diagram of a control circuit achieving a second embodiment of the present invention.

FIG. 14 is a block diagram of the control circuit achieving the first embodiment of the invention.

Figure 15:
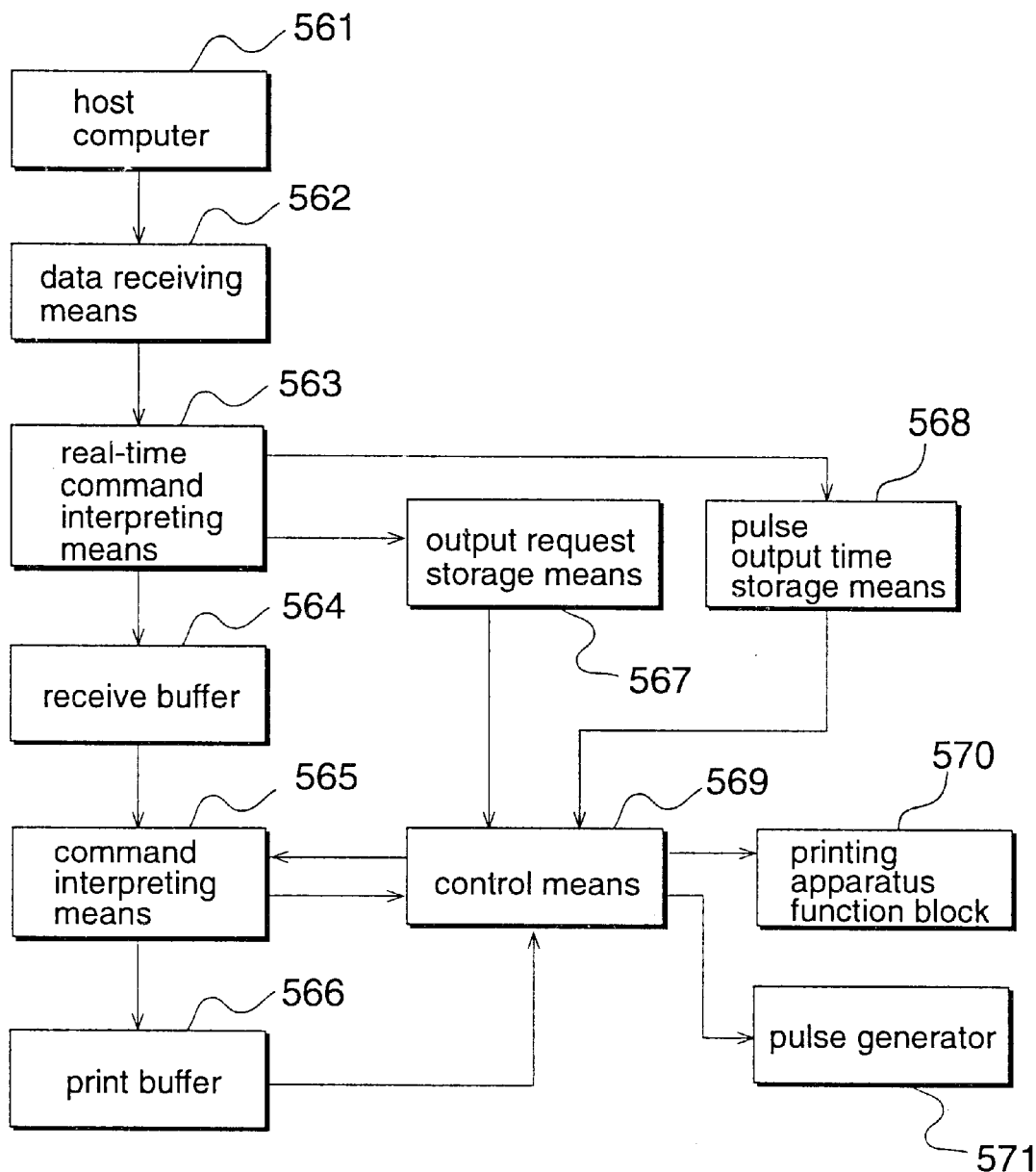
FIG. 15 is a circuit block diagram of a control circuit used to describe the second embodiment of the present invention.

Connected to CPU 550, which controls the entire printing apparatus, are cover sensor 547 for detecting whether the cover is open; panel switch 549 for manual paper feed control; an interface 551 to the host computer 561; non volatile memory, such as read only memory or ROM 552 for storing the control program 52a, printer character patterns, and other data; and memory, such as random access memory or RAM 553 comprising the receive buffer 564 and print buffer 566 shown in FIG. 15.

The print data input through interface 551 is stored to the receive buffer 564 of RAM 553. CPU 550 then interprets this data, reads the character pattern corresponding to the data code from ROM 552, and controls printer mechanism control circuit 543 to accomplish the printing process. More specifically, CPU 550 controls the ink jet head or other print head 540, and motor group 541 for driving print head 540 and the recording medium; and drives plungers 542 to hold cut-sheet forms or switches the recording medium transport path as necessary when the printing apparatus is designed to print to plural media by means of printer mechanism control circuit 543 to print.

Pulse generation control commands for requesting supply of a control or drive pulse to the cash drawer or other external device connected to the printing apparatus are input through interface 551. The input pulse generation control command is interpreted by CPU 550, which outputs a pulse from port 556 or port 557 through drawer drive circuit 555. The determination of which port to be used for pulse output is specified using a parameter of the pulse generation control command as will be described below.

Figure 18:
FIG. 18 is used to describe the preferred command code used in the present invention.

An example of a real-time command code executed immediately after being received is shown in FIG. 18. Each of the command code components DLE, DC4, and the values n, m, and t in FIG. 18 is one byte expressed in hexadecimal code as 10h, 14h, and the hexadecimal value corresponding to n, m, and t.

DLE and DC4 identify a real-time command, and select the content (operation) to be executed based on the value of n. When n=1, the command is interpreted as a real-time output command, and the above process is immediately executed. Parameter m defines the port number of the pulse output port; t defines the pulse output time.

FIG. 15 is a functional block diagram of the overall configuration of the second embodiment of the present invention, and shows the relationship between the various function means. Host computer 561 transfers the command data and print data to the printing apparatus. Data receiving means 562 receives the data code from host computer 561 through the interface, and is achieved in the second embodiment by means of an interrupt process started by interface 551. The received data are interpreted immediately upon being received by real-time command interpreting means 563, implemented as part of the interrupt process for data receiving means 562.

Real-time command interpreting means 563 determines whether the received data is a real-time control command, and causes the specified process to be executed according to the command specification if it is a real-time control command. All data received through real-time command interpreting means 563 is stored temporarily to receive buffer 564. Command interpreting means 565 reads the received data in a first-in-first-out sequence in single data units, e.g., one byte at a time, interprets the data code, and discriminates the print data from the command data used to set various printing apparatus control parameters.

The interpretation of the data stored in receive buffer 564 by command interpreting means 565 is executed in response to a request from control means 569. When the printing apparatus is in an idle state, for example, after a printing job is completed, control means 569 repeats checking whether receive buffer 564 is empty in a normal idling routine. And, if there is data in receive buffer 564, control means 569 causes command interpreting means 565 to perform the command interpretation as described above.

It should be noted that while the data from data receiving means 562 in the present embodiment is stored to receive buffer 564 through a real-time command interpreting means, the present invention shall not be so limited. It is also possible, for example, to store the data from data receiving means 562 to receive buffer 564 while also passing the data to real-time command interpreting means 563 in parallel.

Command data is processed by control means 569. More specifically, particular settings are made according to the command data, or particular operations are performed. If the received data is print data, the character pattern is stored to print buffer 566 according to the data code. When printing is executed by control means 569, the print pattern is read from print buffer 566 to control printing apparatus function block 70 and print.

As shown in FIG. 14, printing apparatus function block 570 comprises primarily printer mechanism control circuit 543, print head 540, motor group 551, and plunger group 542.

When real-time command interpreting means 563 determines that the received data is a real-time pulse output command, the information indicating that a pulse output request was received is stored to output request storage means 567, which is implemented as a portion of RAM 553. This can be accomplished, for example, by setting a particular flag. The pulse output time is also stored as information in pulse output time storage means 568, and is supplied to control means 569. The output port number, another parameter of the command, may be separately stored in another storage means provided in RAM 53 or a respective request flag is provided for each port number.

Control means 569 monitors the real-time pulse output request information by polling output request storage means 567. When a real-time pulse output request is detected, control means 569 outputs a pulse according to the information in the storage means to the specified port by means of pulse generator 571.

When the cover is open or paper is being fed using the paper transport switch, control means 569 enters an off-line state as described above. More specifically, reading and executing commands from receive buffer 564 stops to assure operator safety when the printing apparatus cover is open to, for example, supply the paper. Because receive buffer 564 may overflow if data continue to be stored to receive buffer 564 in this state, the printing apparatus notifies the host device that data sent thereafter are not guaranteed to be received. This state is called the "off-line" state.

When control means 569 is in the off-line state, control means 569 only monitors data input from data receiving means 562, and cannot activate command interpreting means 565. Real-time command interpreting means 563 continues to operate irrespective of the off-line status while control means 569 monitors data input. The present embodiment is also constructed to output the current pulse driving a solenoid built into the cash drawer. Pulse generator 571 and printing apparatus function block 570 also share the same power supply. If the power supply does not have sufficient capacity to simultaneously drive both pulse generator 571 or the solenoid and printing apparatus function block 570, control means 569 may only be able to drive one of the devices during printing or pulse generation.

Figure 16:
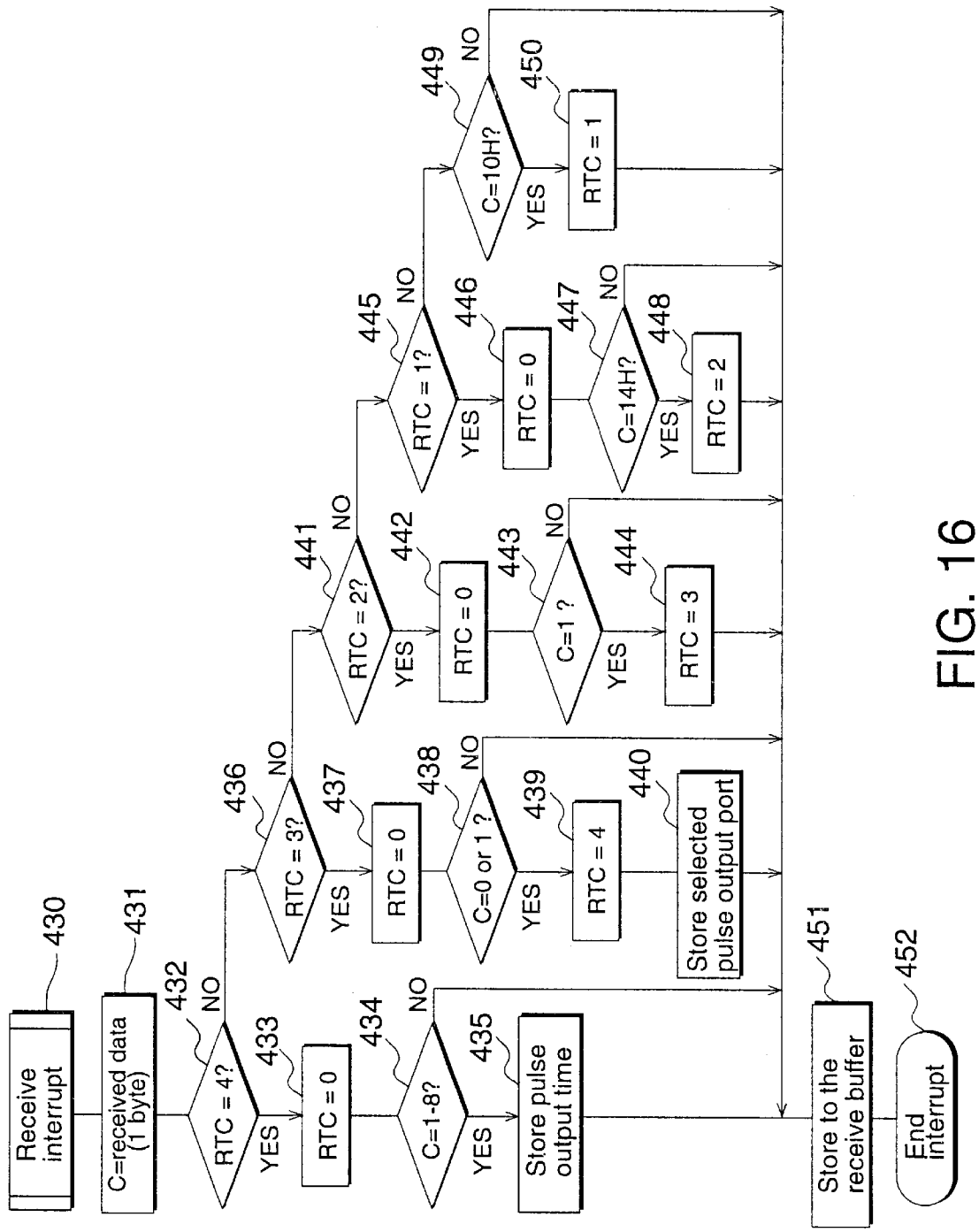
FIG. 16 is a flow chart showing the sequence of the second embodiment of a control method according to the present invention.
Figure 17:
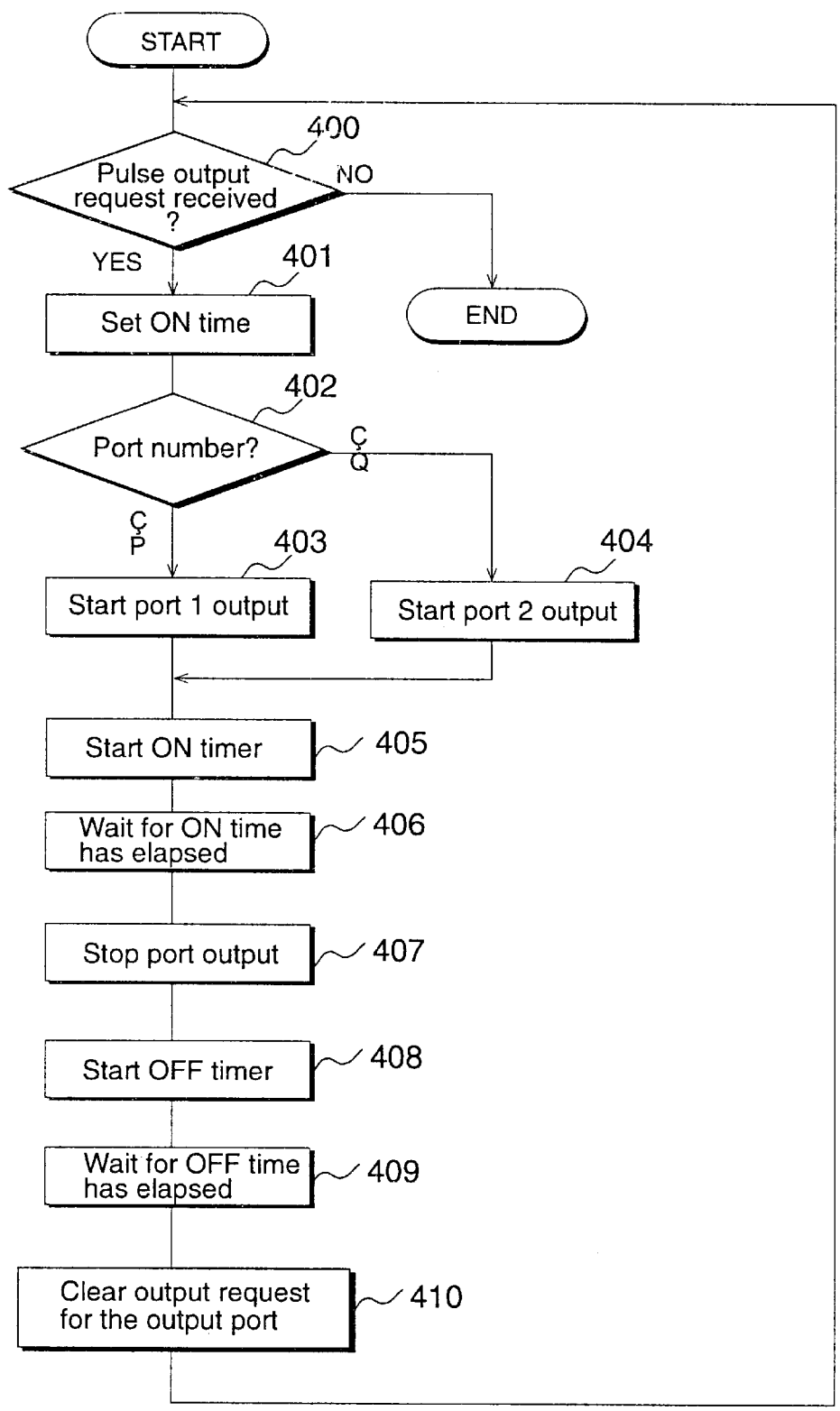
FIG. 17 is a flow chart showing the sequence of the second embodiment of a control method according to the present invention.

FIGS. 16 and 17 are flow charts of the preferred printing apparatus control method according to the present invention. FIG. 16 shows the sequence of the receive interrupt process of the interface, and thus shows the data receiving means 62 and real-time command interpreting means 563. Data received from the host computer through interface 551 is received in data units of a particular size, which is defined as one byte by way of example only in the present embodiment, and the process shown in FIG. 16 is therefore executed each time one data byte is received. The real-time command contains five bytes (DLE, DC4, n, m, and t) as shown in FIG. 18, and is therefore analyzed using a data counter RTC indicating which data byte was received.

RTC is cleared to zero before data receiving means 562 starts receiving the data from the host device in, for example, a power-on initialization procedure of the printing apparatus.

A memory area for storing the port number of the pulse output port defined by parameter m, and a memory area (568) for storing the pulse output time defined by parameter t, are also provided.

When the process starts at step 430, data is received and a receiving interrupt is started.

The received data is read through the interface at step 431, and it is determined whether the RTC counter is set to 4 in step 432. If the RTC counter is set to 4, i.e., if DLE, DC4, 1, and m have been received, the received data ("C" in this example) is processed as parameter t. The RTC counter is then cleared in step 433.

If the value of the received data (C) is from 1 to 8 (step 434), the pulse output time is stored to a specific address in RAM 553 in step 435. Note that all received data is initially stored to the receive buffer, even real-time commands (step 451).

If the value of the received data (C) is outside the range from 1 to 8 (step 434), the counter remains cleared and the data is stored to receive buffer 564 (step 451). Such values are illegal parameters and therefore prohibit the complete command from being processed. The data is nevertheless stored to receive buffer 564 because it may be part of the print data.

If the RTC counter does not equal 4 in step 432, it is determined whether the RTC counter equals 3 in step 437. More specifically, the RTC counter is set to 3 if DLE, DC4, and 1 have been received. The RTC counter is therefore cleared in step 437, and it is determined whether the received data (C) is 0 or 1 (step 438). If C is 0 or 1, the RTC counter is set to 4 (step 439), and the pulse output port number corresponding to the value of C is stored to RAM 553 (step 440). The received data is also stored to the receive buffer (step 451). If the value of the received data (C) is not 0 or 1 (step 438), the counter remains cleared and the data is stored to the receive buffer (step 451) for the same reason described above.

If the RTC counter does not equal 3 in step 436, it is determined whether the RTC counter equals 2 in step 441. More specifically, the RTC counter is set to 2 if DLE and DC4 have been received. The RTC counter is therefore cleared in step 442, and it is determined whether the received data (C) is 1 (step 443). If C is 1, the RTC counter is set to 3 (step 444), and the received data is stored to the receive buffer (step 451).

If the value of the received data (C) is other than 1 (step 443), the counter remains cleared and the data is stored to the receive buffer (step 451).

Note that parameter n is used to identify the real-time command operation. When n=1, pulse generation processing is accomplished. When n does not equal 1, i.e., is a value other than 1, a different real-time process may be executed. Because other real-time processes are not defined in the present embodiment, such real-time processing does not occur.

If the RTC counter does not equal 2 in step 441, it is determined whether the RTC counter equals 1 in step 445. More specifically, the RTC counter is set to 1 if DLE has been received. The RTC counter is therefore cleared in step 446, and it is determined whether the received data (C) is DC4 (step 447). If C is DC4, the RTC counter is set to 2 (step 448), and the received data is stored to the receive buffer (step 451).

If the value of the received data (C) is other than 14h (step 447), the counter remains cleared and the data is stored to the receive buffer (step 451).

If the RTC counter does not equal 1 in step 445, it is determined whether the received data (C) is the DLE code (step 449).

If C is DLE, the RTC counter is set to 1 (step 450); if not, the received data is stored to the receive buffer (step 451) and the receive interrupt process is terminated (step 452).

If in step 449 the value of C is other than DLE (10h), the counter remains cleared and the data is written to the receive buffer (step 451).

The pulse output control means is described next with reference to the flow chart in FIG. 17.

Control means 569 monitors real-time pulse output request represented by the output request flag stored in output request storage 567, and reads the pulse ON time from the pulse output time storage means 568 (step 401) when a real-time pulse output request is detected (step 400 returns YES).

The pulse output port number is read from the output request storage means 567 (step 402), and the pulse is output (step 403 or step 404).

A timer counting the ON time is activated (step 405), the process waits for the ON time period (step 406), pulse output to the port is then stopped (step 407), the OFF time counter is started (step 408), and the process waits for the OFF time (step 409). When the OFF time has passed, the output request flag for the port for which an output request was issued is cleared (step 410), and the process loops back to step 400 to determine whether the next output request was received. If there is no output request, the process continues to look for the next output request.

It should be noted that the OFF time in the present embodiment is set to the same time as the ON time specified by command. It is also possible, however, to set the OFF time by means of a command parameter using a process similar to that described above. Note that the OFF time is set and pulse output requests are effectively prohibited during this OFF time period to limit the drive duty of the control object. More specifically, if an OFF time is not defined and commands are transferred continuously, the ON state duty of the control pulse may be excessively large.

The pulse output process shown in FIG. 17 in the present embodiment is executed during the standby loop of the printing apparatus control program executed by CPU 550. This loop is therefore not executed during the printing process, and the pulse output process is therefore not executed. In this case, the pulse output process is executed when one printing process is completed and the control program returns to the standby loop to start the next process.

However, if it is necessary to execute the pulse output process irrespective of the printing process, the process can be executed by means of an internal interrupt, timer interrupt, or other known interrupt process.

If there is sufficient power supply capacity, the printing process and pulse output process can be executed in parallel. More specifically, the ON time standby period (step 406) and the OFF time standby period (step 409) in FIG. 17 can be used to easily achieve parallel printing and pulse output processes by means of time-shared printing control. Furthermore, the printing process functions can be handled by printer mechanism control circuit 543 using a microcontroller, for example, and the pulse output process can be executed in parallel by CPU 550.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A printing apparatus comprising:

data receiving means for receiving command data from a host device;

data storage means for storing the command data received by the data receiving means;

printer control means for reading the command data stored in the data storage means in a first-in-first-out order and controlling a printing process according to the command data;

command detection means for directly detecting predetermined command data from the command data received by the data receiving means; and external device control means for controlling an external device connected to the printing apparatus according to the predetermined command data detected by said command detection means.

2. The printing apparatus according to claim 1, wherein said external device control means controls the external device substantially simultaneously to said printer control means controlling the printing process.

3. The printing apparatus according to claim 1, wherein said external device control means controls the external device with a higher priority than a priority of said printer control means controlling the printing process.

4. The printing apparatus according to claim 1, wherein said external device control means controls the external device according to a completion of the printing process.

5. The printing apparatus according to claim 1, wherein said external device control means comprises at least one pulse generating means for generating pulses of which a pulse width is determined according to said predetermined command data.

6. The printing apparatus according to claim 5, wherein said external device control means further comprises selection means for selecting one of said at least one pulse generating means according to said predetermined command data.

7. The printing apparatus according to claim 5, wherein the external device comprises a cash drawer, and wherein said external device control means comprises a drawer control means for controlling cash drawer opening.

8. The printing apparatus according to claim 1,
wherein the command data comprise plural data units of a predetermined size,
wherein said command detection means comprises:
a data counter for counting a number of data units, and
comparison means for comparing the data unit received by said data receiving means with a command pattern representing predetermined command data according to said data counter.

9. The printing apparatus according to claim 8, wherein one of said data receiving means and said command detection means interrupts the printing process controlled by said printer control means to one of
(1) receive data from the host device, and
(2) detect predetermined command data from the data received by said data receiving means.

10. A method for controlling a printing apparatus comprising the steps of:
(a) receiving command data from a host device;
(b) storing the command data received by step (a);
(c) reading the command data stored in step (b) in a first-in-first-out order and controlling the printing apparatus according to the command data;
(d) directly detecting predetermined command data from the command data received by step (a); and
(e) controlling an external device connected to the printing apparatus according to a predetermined command data detected by step (d).

11. The control method according to claim 10 wherein step (e) is executed substantially simultaneously to step (c).

12. The control method according to claim 10, wherein step (e) has priority over step (c).

13. The control method according to claim 10, wherein step (e) is executed after step (c).

14. The control method according to claim 10, wherein step (e) comprises the steps of:
determining at least one port according to the predetermined command data; and
at least one step of generating pulses having a pulse width determined by the predetermined command data.

15. The control method according to claim 10,
wherein in step (a) data from the host device comprises plural data units of a predetermined size, and
wherein step (d) comprises the steps of:
counting a number of data units, and
comparing the data unit received in step (a) with a command pattern representing predetermined command data according to the data count value.

16. The control method according to claim 15, wherein at least one step (a) and step (d) executes while step (c) is interrupted.

17. The control method according to claim 15, wherein the execution of step (a) causes the interruption of step (c).

18. A printing apparatus comprising:
a data receiver to receive command data from a host device;
a memory to store the command data received by the data receiver;
a printer controller to read out the command data stored in the memory in a first-in-first-out order and control the printing apparatus in accordance with the command data;
a command detector to directly detect predetermined command data within the command data received by the data receiver; and
an external device controller to control an external device connected to the printing apparatus in accordance with the predetermined command data detected by the command detector.

19. A printing apparatus according to claim 18, wherein the external device controller controls the external device substantially simultaneously to the printer controller controlling the printing apparatus.

20. A printing apparatus according to claim 18, wherein the external device controller controls the external device with a higher priority than a priority of said printer controller controlling the printing apparatus.

21. A printing apparatus according to claim 18, wherein the external device controller controls the external device in accordance with a completion of a present printing apparatus control process.

22. A printing apparatus according to claim 18, wherein the external device controller comprises at least one pulse generator to generate pulses of which the pulse width is determined in accordance with the predetermined command data.

23. A printing apparatus according to claim 22, wherein the external device controller further comprises a selector to select one of the at least one pulse generator in accordance with the predetermined command data.

24. A printing apparatus according to claim 22, wherein the external device comprises a cash drawer, and wherein the external device controller comprises a drawer controller to control cash drawer opening.

25. A printing apparatus according to claim 18,
wherein the predetermined command data comprise plural data units of a predetermined size,
wherein the command detector comprises:
a data counter for counting a number of data units, and
a comparator to compare the data unit received by the data receiver with a command pattern representing the predetermined command data in accordance with the data counter.

26. A printing apparatus according to claim 18, wherein one of the data receiver and the command detector, while the printing apparatus control process controlled by the printer controller is interrupted, one of
(1) receives data from the host device, and
(2) detects predetermined command data from the data received by the data receiver.

* * * * *